Sept. 13, 1960          J. A. HANSEN ET AL          2,952,170
       MACHINE TOOL WITH A MECHANICAL CUTTING TOOL CHANGER
Filed March 10, 1958                           5 Sheets-Sheet 1

INVENTORS
John A. Hansen
Charles A. Parske
BY Kurt A. Riedel

Elroy J. Wutschel
Attorney

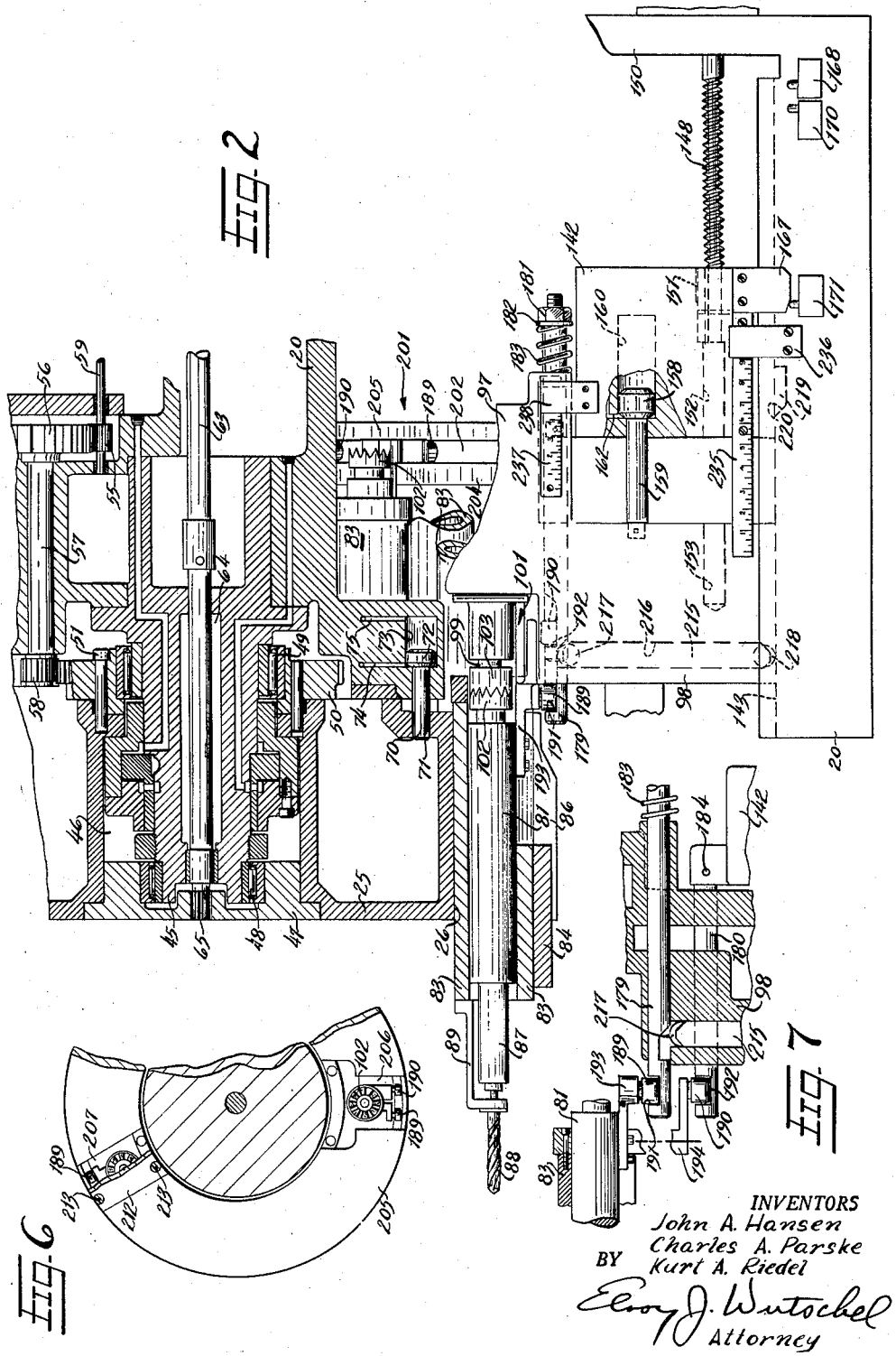

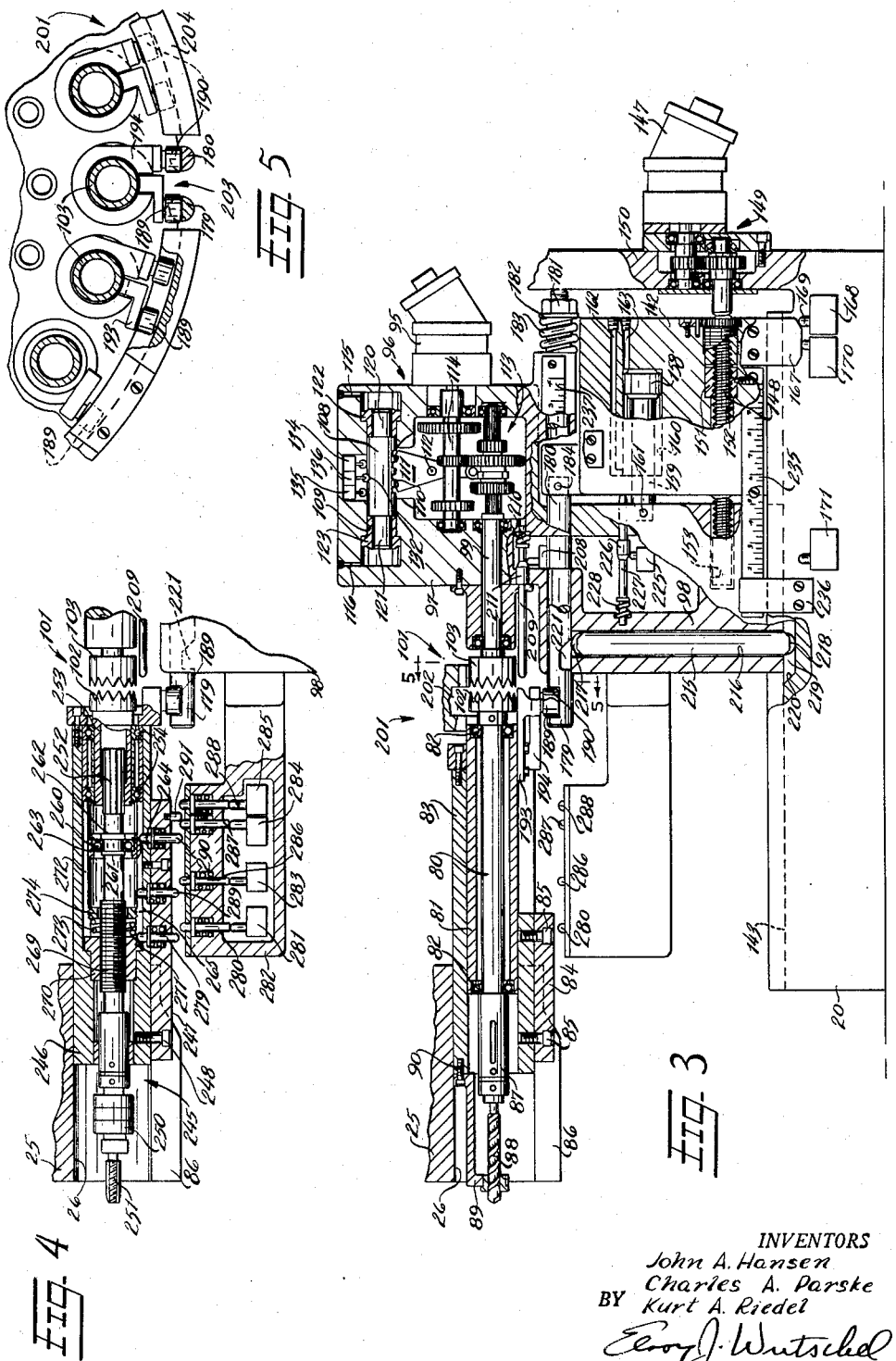

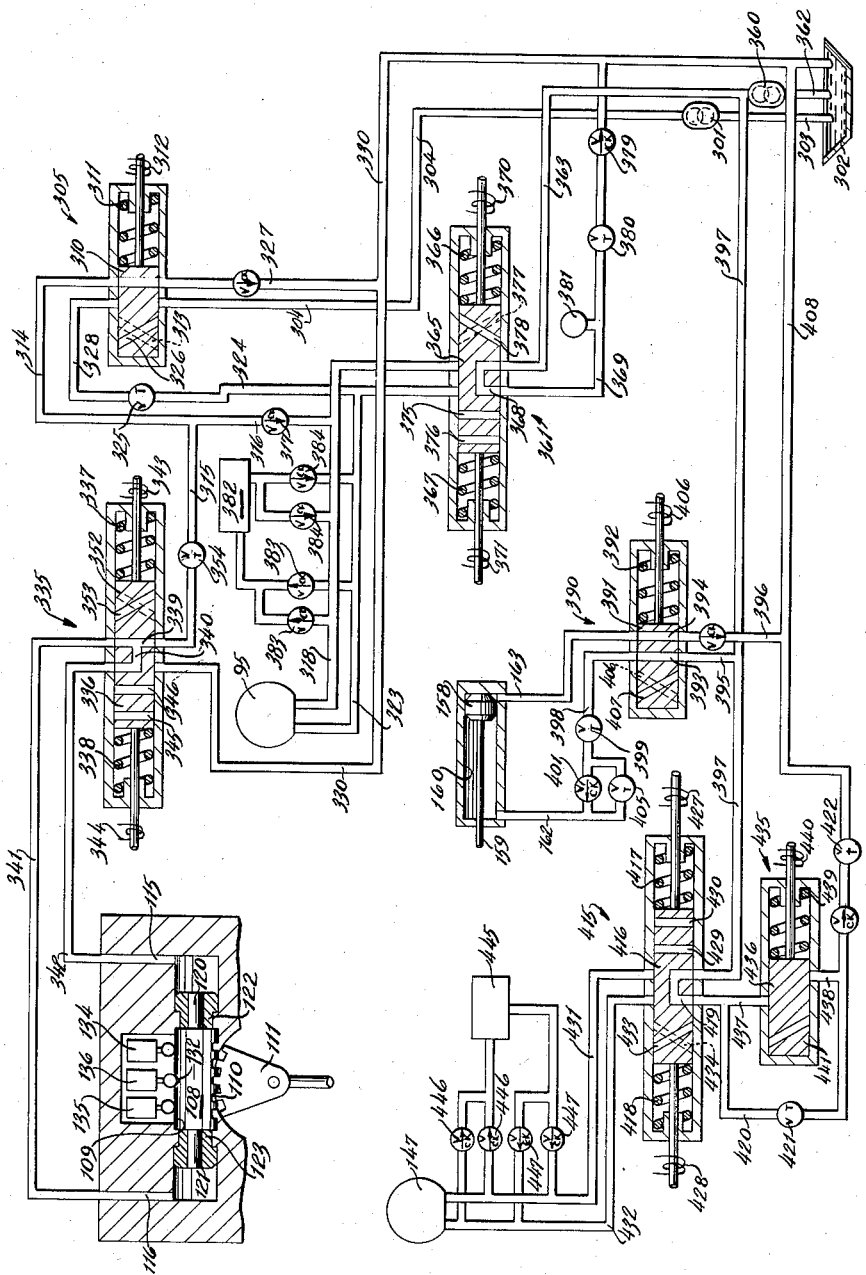

Fig. 9

United States Patent Office 2,952,170
Patented Sept. 13, 1960

2,952,170
MACHINE TOOL WITH A MECHANICAL
CUTTING TOOL CHANGER

John A. Hansen, Greendale, and Charles A. Parske and Kurt A. Riedel, Milwaukee, Wis., assignors to Kearney & Trecker Corporation, West Allis, Wis., a corporation of Wisconsin Filed Mar. 10, 1958, Ser. No. 720,395
24 Claims. (Cl. 77—25)

This invention relates generally to machine tools and more particularly to an improved machine tool especially adapted to rapidly effect a change of rotary cutting tools to enable the machine to perform several different machining operations on one or more workpieces in rapid succession.

It is a general object of the present invention to provide an improved machine tool incorporating a mechanical cutting tool changer.

Another object of the present invention is to provide a machine tool with a cutting tool changer especially adapted to present different types of rotary cutting tools for utilization by the machine with a mechanism for automatically connecting the selected cutting tool to a drive mechanism for rotating the cutting tool.

Another object is to provide an improved machine tool with a cutting tool changer adapted to make available a substantial quantity of different cutting tools for operation with the machine to enable the machine to rapidly perform a succession of different machining operations.

Another object is to provide an improved machine tool employing a rotary cutter and incorporating a tool changer that functions to change the cutting tool in the machine with rapidity while requiring a minimum of effort on the part of the operator.

Another object is to provide a machine tool which has a variety of rotary cutting tools immediately available and automatically positions and connects a selected one of the cutting tools for rotation by the power drive of the machine and operates to position and feed the selected rotating cutting tool toward a workpiece for performing a machining operation while maintaining the driving connection.

Another object is to provide a machine tool with a mechanical tool changer having a number of cutting tools available for selective operation with the machine, the machine being operable to position the selected tool in three mutually transverse paths relative to a workpiece.

A further object is to provide a machine tool having a mechanical cutting tool changer, the machine being capable of automatic operation and incorporating suitable hydraulic and electrical interlocks that serve to control its operation in the event of a malfunctioning of a portion of the mechanism for the purpose of preventing damage to the machine, the cutter or the workpiece.

According to this invention the improved machine tool comprises a base rotatably supporting a drum, the drum being also rectilinearly movable on the base in two mutually transverse paths. A plurality of bores are formed in the drum with the axes of the bores being parallel to the axis of the drum and equally spaced along a circle adjacent to the periphery of the drum. Each of the bores contains a tool carrying spindle that is rotatably mounted in a quill which is slidably carried within the bore for the purpose of rendering the spindle axially adjustable. A cutting tool is attached to the forward end of each of the spindles while a clutch element is secured to the opposite end. The drum is indexable to bring any one of the spindles and its associated cutting tool into operating position and when so located, the clutch element carried by the spindle will be in alignment with a cooperating clutch element connected to be driven by a variable speed transmission.

The transmission is mounted on a slide that is movably carried by the machine so that movement of the slide will produce a like movement of the transmission. The slide is provided with coupling means for coupling the quills of a spindle that has been brought into operating position to the slide in order that movement of the latter may operate to adjust the spindle axially in a positioning and feeding movement. The coupling means is arranged so that initial movement of the slide is relative to the spindle for the purpose of moving the transmission and its associated clutch element to move the transmission clutch element into engagement with the spindle clutch element for completing a driving connection from the transmission to the tool carrying spindle. After the clutch elements are engaged, the coupling means operates to connect the spindle for movement with the slide and movement of the slide will then function to position and feed the spindle and its associated cutting tool relative to a workpiece. Upon completion of a machining operation, the spindle may be retracted and the drum may then be indexed to bring a new cutting tool into operating position.

The foregoing and other objects of this invention, which will become more fully apparent from the following detailed description, may be achieved by means of the exemplifying apparatus depicted in and set forth in this specification in connection with the accompanying drawings, in which:

Fig. 2 is an enlarged fragmentary view partly in vertical section and partly in side elevation illustrating the arrangement of the drum and the spindle positioning and feed slides when in their forward position;

Fig. 3 is an enlarged fragmentary view partly in vertical section and partly in side elevation depicting a drilling and counterboring spindle in its retracted position along with the positioning and feed slides in their fully retracted position;

Fig. 4 is a detail view partly in vertical section and partly in side elevation showing a tapping spindle that is carried in one of the bores of the drum illustrated in Fig. 1;

Fig. 5 is a detail view substantially in rear elevation illustrating the roller track for retaining the inoperative spindles in their retracted position within the drum;

Fig. 6 is a rear elevational view of the roller track, similar to Fig. 5, but also depicting the opening in the back plate of the track for removing the spindle and their associated quills from the drum;

Fig. 7 is a detail view substantially in side elevation illustrating the mechanism for coupling and operatively locking the located spindle to the positioning and feed slides;

Fig. 8 is a diagrammatic view of the hydraulic circuit incorporated in the machine; and, Fig. 9 is a diagrammatical showing of the electrical control circuit for controlling the operation of the machine.

Figure 1:
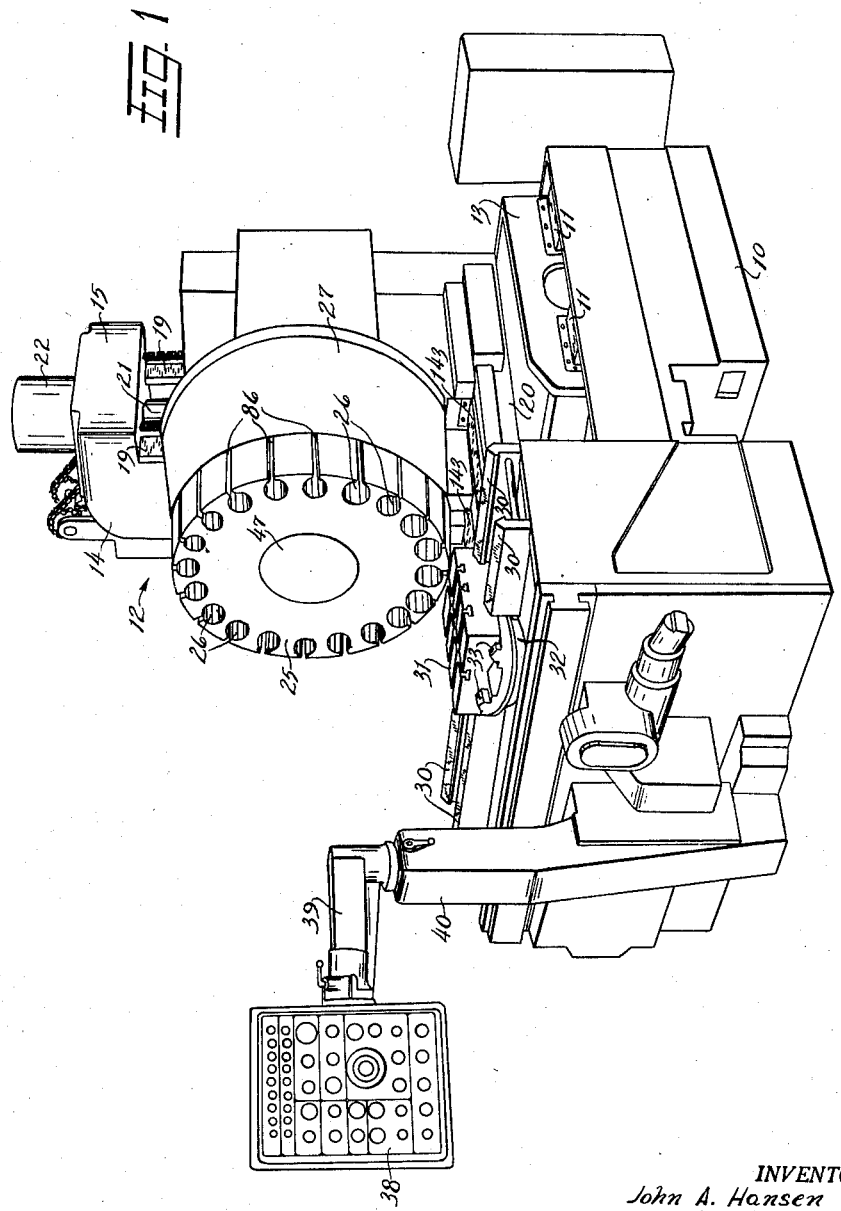
Figure 1 is a perspective view of a machine tool incorporating the features of the present invention.

Reference is now made more particularly to the drawings and specifically to Fig. 1 thereof illustrating a machine tool incorporating the various features of the present invention. As there shown, the machine generally comprises a base 10 which presents a pair of horizontal ways 11 longitudinally disposed along its upper surface. The ways 11 are engaged by complementary ways (not shown) formed on the underside of a carriage generally identified by the reference numeral 12, the ways 11 functioning to slidably support the carriage 12 for movement along the bed 10. The carriage 12 comprises a horizontal base 13 which is provided with the ways (not shown) along its underside for engagement with the ways 11. The base 13 supports an upstanding column 14 and an overhanging cap 15 formed on the upper end of the column 14.

The interior face of the column 14 is provided with a pair of vertical ways 19 that slidably support a saddle 20 for vertical movement. The vertical movement of the saddle 20 is effected by means of a screw 21 that is journalled at one end in the cap 15 and at its opposite end in the base 13. The screw 21 is in threaded engagement with a cooperating nut (not shown) which is secured to the saddle 20. Rotation of the screw 21 will therefore cause a movement of the saddle 20 along the ways 19 in either direction, depending upon the direction of rotation of the screw 21, and the screw may be rotated by any suitable means, as for example, the source of power 22 located on top of a cap 15 above the screw 21. The saddle 20 is therefore movable either vertically or horizontally relative to the bed 10.

The lower portion of the saddle 20 is disposed directly above the carriage 13 and extends upwardly therefrom to rotatably support the drum 25. The drum 25 functions to carry a plurality of cutting tools and their associated spindles for selective operation with the machine. To this end, the drum 25 is provided with a plurality of bores 26 which serve to rotatably and slidably support the spindles in a manner to be subsequently described. The bores 26 extend through the entire depth of the drum 25 and are equally spaced along a circle adjacent to the periphery of the drum with their axes being parallel to the axis of the drum. A circular shroud 27 is disposed about the rearward portion of the drum to protect the operating mechanism.

The forward portion of the bed 10 presents an elevated surface for supporting a pair of inverted V-shaped ways 30 that extend longitudinally thereof for slidably carrying a pallet 31 upon which a workpiece (not shown) may be secured in position to be operated upon by one of the cutting tools carried by the drum 25.

The V-shaped ways 30 are interrupted by a rotary table 32 which presents a pair of V-shaped ways 33 on its upper surface which conform to the ways 30 in spacing and configuration so that they may be aligned therewith to form continuous ways upon which the pallet 31 may be moved. When the pallet 31 is first moved into operating position, the ways 33 of the rotary table 32 will be in alignment with the ways 30 of the bed 10. The pallet 31 is therefore slid along the ways 30 onto the ways 33 and is secured by suitable means (not shown) to the rotary table 32. If necessary, the rotary table 32 may then be revolved and indexed to effect a like rotary movement of the workpiece that is secured to the pallet 31 so that a machining operation may be performed on one or several sides of the workpiece.

It is to be understood that a conventional machine tool table may be substituted for the pallet and way arrangement illustrated in the exemplary embodiment. However, the pallet and way construction is depicted in order to disclose a machine which is capable of completely automatic operation in which the pallets 31 with workpieces secured thereto are moved successively by a conveyor onto the ways 30 and 33 with each of the pallets 31 being secured successively to the rotary table 32. The workpiece on the pallet 31 will then be located at the operating station and may then be operated upon by one or more of the cutting tools carried by the drum 25 to complete the desired machining operation with the cutting tools that are employed being located successively at the operating station by rotating the drum to its appropriate index position. Such operation of the machine may be performed under the control of recorded information, as for example, the signals received from a punched or magnetic tape.

The manual controls are conveniently supported at the front of the machine on a control panel 38 that is mounted on the exterior end of a horizontal arm 39. The latter, in turn, is pivotably carried by an upstanding post 40 that is secured to the front of the bed 10.

The mounting of the drum 25 on the saddle 20 is clearly shown in Fig. 2, the saddle presenting a forwardly and horizontally extending post 45 that protrudes into a bore 46 concentrically formed in the drum 25. The forward end of the bore 46 is sealed by a closure 47 which is attached to the drum 25 to rotate with it. The interior surface of the closure 47 is provided with a concentric circular recess for receiving a roller bearing 48 in which the post 45 is journalled. The interior end of the drum 25 is rotatably supported by a roller bearing 49 that has its inner race mounted on the post 45 and its outer race in engagement with the body of a spur gear 50. The spur gear 50 is secured to the interior end of the drum 25 by suitable cap screws 51 which extend through the gear 50 into threaded engagement with an annular flange that extends inwardly into the bore 46. The drum 25 is therefore rotatably supported by the two bearings 48 and 49 that serve to render it freely rotatable upon the post 45 which is secured to the saddle 20.

Rotation of the drum 25 may be achieved by revolving a spur gear 55 which is in meshing engagement with a cooperating spur gear 56. The spur gear 56 is keyed to a shaft 57 that is rotatably supported by the saddle 20 and has another gear 58 keyed to its opposite end in position to mesh with the gear 50. The gear 55 is keyed to a shaft 59 that is rotatably supported by the saddle 20 and is connected to suitable mechanism (not shown) to produce the indexing movement of the drum 25 in well known manner. Rotation of the shaft 59 will produce the desired rotation of the drum 25.

If the drum 25 is to be indexed manually, a simple hand crank may be attached to the shaft 59 for manual operation and a detent mechanism (not shown) may be provided to establish the indexing positions of the drum to establish the operating location for each of the bores 26. The operator may then rotate the hand crank to revolve the drum 25 until the detent mechanism is engaged at the desired index position to place the selected bore 26 at the operating station. On the other hand, the shaft 59 may be connected to a source of power for power operation of the drum 25 and the source of power may be regulated by a control mechanism for automatically effecting the desired indexing movement, as for example, in the manner disclosed in the copending patent application of John A. Hansen, Serial No. 720,361, filed March 10, 1958.

In order to provide for automatic operation of the indexing movement of the drum 25, an indicator shaft 63 extends through a bore 64 formed in the post 45 and is rotatably journalled within the post for rotation relative thereto. The shaft 63 is provided with a splined end 65 at its forward extremity to engage a complementary splined hole formed in the closure 47. The splined connection with the closure 47 serves to cause the indicator shaft 63 to rotate with the drum 25 relative to the post 45 so that the shaft 63 may be connected to indicate the amount of rotation in any well known manner to accommodate either manual or automatic indexing of the drum 25. Thus, for example, if the drum 25 is to be indexed automatically, the shaft 63 may be connected so that its rotation with the drum 25 will serve to produce electrical impulses that will indicate the degree of rotation of the drum 25 and cooperate with a control circuit to regulate the operation of the source of power so that the desired indexing of the drum 25 is obtained.

Since the apparatus for producing such automatic indexing of the drum 25 is not a part of the present invention, it is not here described or shown and the features of the present invention will operate with any type of indexing mechanism even though it may be a simple manual rotation of the shaft 59.

The drum 25 may be locked in the selected index position by means of a hydraulically actuated locking plunger 70 that is slidably carried by the saddle 20 for selective insertion into any one of a plurality of holes 71 formed in the rear wall of the drum 25. The number of holes 71 corresponds to the number of bores 26 in the drum with each of the holes 71 being located for receiving the plunger 70 when the drum 25 has been indexed to locate one of the spindles in the bores 26 at the operating station.

One end of the plunger 70 is provided with a piston 72 slidably disposed within a cylinder 73 that is formed in the saddle 20. A pair of conduits 74 and 75 serve to carry hydraulic pressure to and from the cylinder 73 for the purpose of actuating the piston 72 and its associated plunger 70. When it is desired to move the plunger 70 into one of the holes 71 for locking the drum 25 in position, hydraulic pressure is admitted into the right end of the cylinder 73 as viewed in Fig. 2, through the conduit 75 and the exhaust fluid is carried from the left side of the piston 72 through the conduit 74. The plunger 70, of course, is withdrawn from the hole 71 by admitting fluid pressure to the left end of the cylinder 73 through the conduit 74 and the exhaust fluid is then carried from the cylinder 73 by the conduit 75.

In the event the drum 25 is arranged to be indexed manually by manual rotation of the shaft 59, the holes 71 in the drum 25 may also serve to cooperate with a detent mechanism for accurately locating the drum 25 in the indexed positions. Thus, a spring urged ball (not shown) may be carried by the saddle 20 in position to partially enter the holes 71 as the drum 25 rotates, and as the ball is urged by the spring into any one of the holes 71, the ball will yieldably retain the drum 25 in that particular position to properly locate it for placing one of the spindles at the operating station. Additional torque on the shaft 59 will overcome the spring pressure upon the ball to permit further rotation of the drum 25 to the succeeding index position, and actual locking of the drum 25 in the desired position is achieved by actuating the plunger 70 as described to enter one of the holes 71.

The machine illustrated as an exemplary embodiment is arranged to perform drilling, counterboring and tapping operations although it is to be understood that other types of cutting tools may be employed with the structure of the present invention without departing from its spirit and scope. The spindle arrangement illustrated in Figs. 2 and 3 is provided to perform both drilling and counterboring operations while the spindle depicted in Fig. 4 is utilized for performing tapping operations.

The drilling and counterboring arrangement comprises a spindle 80 rotatably supported within an inner quill 81 by two ball bearings 82. The inner quill 81 is slidably supported for axial movement within an outer quill 83 which, in turn, is likewise slidably supported for axial movement within one of the bores 26 of the drum 25. A key 84 is secured to the outer quill 83 by means of screws 85 and is disposed within a cooperating slot 86 to prevent the outer quill 83 from rotating within the bore 26 without interfering with its axial movement. As clearly shown in Fig. 1, a slot 86 is proivded for each of the bores 26 and extends radially from the bore 26 to the periphery of the drum 25. The forward end of the spindle 80 is provided with a suitable chuck 87 for removably securing a cutting tool 88 therein in well known manner. Since the cutting tool 88 is illustrated as being a drill of considerable length in Figs. 2 and 3, a guide or drill bushing 89 is provided for guiding the drill 88 in its feeding movement, the guide 89 being secured by a screw 90 to the exterior end of the outer quill 83.

Power for individually driving the several spindles carried by the drum 25 is derived from a hydraulic motor 95 that is connected to drive a variable speed transmission generally identified by the reference numeral 96. The motor 95 is mounted on a transmission housing 97 which is supported on top of a feed slide 98 so that the transmission 96 will move with the feed slide. The transmission 96 operates to drive an output shaft 99 which is journalled in the transmission housing 97 and functions to drive any one of the spindles that may be selected with the driving connection being made through a clutch generally identified by the reference numeral 101.

The clutch 101 comprises two clutch elements 102 and 103 with the clutch element 103 being secured to the end of the output shaft 99 while a clutch element 102 is attached to the interior end of each of the spindles that are carried within the several bores 26. Each of the spindles may therefore be connected by the clutch 101 to be rotated by power from the motor 95 and the driving connection may be broken by disengaging the clutch 101 to permit the drum 25 to be indexed for bringing a new spindle to the operating station.

The rate of operation of the motor 95 may be varied by adjustment of a hydraulic flow control valve which is a part of the hydraulic circuit to be subsequently described and which may be adjusted to infinitely vary the rate of operation of the hydraulic motor 95 within prescribed limits. The transmission 96 shown as an exemplary embodiment is a three step transmission, shiftable into three positions to furnish three speed ranges for operation in conjunction with the infinitely variable speed feature of the hydraulic motor 95 so that the spindles may be rotated at infinitely variable rates within a wide range as established by the fixed step transmission operating in conjunction with the infinitely variable rate of operation of the hydraulic motor 95. The particular power train illustrated is a preferred embodiment but it is to be understood that other types of power trains may be provided without detracting from the performance of the features of the present invention.

Shifting of the transmission 96 is effected by the movement of a piston 108 located within a cylinder 109 formed in the transmission housing 97. The piston 108 is provided with a gear rack 110 disposed to mesh with a gear segment formed on the upper edge of a pivotable shifting fork 111. The shifting fork 111 may pivot about a pin 112 and engages a gear cluster 113 which has splined engagement with the output shaft 99 so that the gear cluster 113 may be shifted into three operating positions along the shaft 99 without interrupting its driving connection with the shaft to establish the three speed ranges of the transmission. The gear cluster 113 includes three gears that are adapted to be selectively engaged with three complementary gears keyed to a drive shaft 114. The drive shaft 114 is connected to be driven by the hydraulic motor 95 so that the power from the motor 95 is transmitted through the shaft 114 to the output shaft 99 through the cooperating gears for driving the selected spindle.

Shifting of the gear cluster 113 is effected by actuating the piston 108 into any one of three positions to cause a pivotable movement of the shifting fork 111. If hydraulic pressure is admitted into the right end of the cylinder 109 through a conduit 115 the piston 108 will be moved to the left end of the cylinder 109 to cause a pivoting of the shifting fork 111 for shifting the gear cluster 113 to its extreme rightward position along the splined portion of the output shaft 99 to establish the high speed range of operation. On the other hand, if hydraulic pressure is admitted to the left end of the cylinder 109 through a conduit 116, the piston 108 will be moved to the right end of the cylinder 109 to pivot the shifting fork 111 in a direction for moving the gear cluster 113 to its extreme leftward position to establish the medium speed range of operation. The low speed range of operation is achieved by admitting pressure to both conduits 115 and 116 to center the piston 108 within the cylinder 109 in the manner illustrated in Fig. 3. In this manner, three ranges of operation are provided for operating in conjunction with the infinitely variable rate of operation of the hydraulic motor 95 to provide an infinitely variable rate of rotation of the spindles through a wide range.

The piston 108 is a pressure differential piston to insure that it will be accurately centered when pressure is admitted to both ends of the cylinder 109. To this end, it is provided with reduced end portions 120 and 121 for slidably receiving sleeves 122 and 123 respectively which operate in well known manner to cause the piston 108 to center itself whenever reasonably equal pressures are admitted into both ends of the cylinder 109.

The upper portion of the piston 108 is provided with a central notch 132 in its upper surface for receiving the plunger of any one of three limit switches 134, 135 and 136 depending upon the position of the piston 108. When the piston 108 is shifted to one of its three positions, the notch 132 will be located to receive the plunger of one of the three limit switches. As the plunger of the limit switch enters the notch 132 it actuates its associated switch to indicate that the desired speed range is established. Thus, when the piston 108 is moved to its extreme rightward position, the plunger of the limit switch 134 will drop into the notch 132 to indicate that the medium speed range has been established in the transmission 96. In like manner, the limit switch 135 indicates that the high speed range is established while the limit switch 136 indicates that the low speed range has been established when its plunger enters the notch 132 as illustrated in Fig. 3.

The feed slide 98 and a positioning slide 142 are slidably carried by the saddle 20, being mounted on ways 143 that are formed on the portion of the saddle 20 that lies beneath the drum 25. The ways 143 cooperate with complementary ways formed on the underside of the feed slide 98 and the positioning slide 142 to slidably support the slides for horizontal cross positioning movement toward and away from the drum 25. The feed slide 98 and the positioning slide 142 will move together except when effecting a feeding movement in a drilling operation, at which time the feed slide 98 will move relative to the positioning slide to feed the drill into the workpiece.

Power for producing the combined movement of the feed and positioning slides is derived from a hydraulic motor 147 which is connected to drive a screw 148 through a pair of cooperating spur gears 149 that are rotatably supported within a recess formed in a back plate 150 which extends upwardly from the rear portion of the saddle 20 as clearly shown in Fig. 3. The motor 147 is mounted on the back plate 150 and is connected to drive the gears 149. The screw 148 is journalled in the back plate 150 and extends forwardly therefrom into threaded engagement with a split nut 151 that is fixedly secured to the positioning slide 142 within a bore 152. A cooperating bore 153 is also formed in the feed slide 98 for the purpose of providing clearance for the forward end of the screw 148. The nut 151 is of split construction so that it may be adjusted for eliminating back-lash between the screw and the nut in well known manner.

Since the nut 151 is fixed to the positioning slide 142, rotation of the screw 148 will cause a movement of the slide 142 along the ways 143. The feed slide 98 is coupled to the positioning slide 142 to move with it by a piston 158 and its associated connecting rod 159. The piston 158 is disposed within a cylinder 160 formed in the positioning slide 142 and its connecting rod 159 extends forwardly through a suitable bore formed in the positioning slide 142 to be attached to the feed slide 98 by means of a pin 161.

Hydraulic pressure is admitted to the cylinder 160 through a pair of conduits 162 and 163 with the conduit 162 being in communication with the left end of the cylinder 160 while the conduit 163 is in communication with the right end of the cylinder 160 as clearly shown in Fig. 3. During operation of the machine, hydraulic pressure is continuously directed into the conduit 162 to admit pressure into the left end of the cylinder 160 as viewed in Fig. 3 for forcing the piston 158 to the right end of the cylinder and thereby couple the feed slide 98 to the positioning slide 142 so that the two slides will move in unison when the hydraulic motor 147 is actuated. It is only during a drill feeding movement that the flow of hydraulic pressure in the conduits 162 and 163 is reversed so that the pressure is directed into the conduit 163 to admit it into the right end of the cylinder 160 for forcing the piston 158 to the left end of the cylinder and thereby move the slide 98 leftwardly relative to the positioning slide 142. Upon completion of the feeding movement, the flow of hydraulic pressure into the cylinder 160 is again reversed and maintained to securely couple the two slides together.

The unitary cross positioning movement of the feed slide 98 and the positioning slide 142 is controlled by a plurality of limit switches mounted on the saddle 20 to be actuated by a dog 167 that is attached to the positioning slide 142 to move with it. A cross positioning reverse limit switch 168 presents an upwardly extending spring urged plunger 169 which is forced downwardly by the dog 167 when the slides 98 and 142 arrive at their fully retracted position to actuate the limit switch 168 for terminating the operation of the motor 147 in a manner to be subsequently described. Another limit switch 170 is likewise actuated by the dog 167 for an interval during the final portion of the rearward movement as well as during the initial portion of the forward movement of the slides, and serves to control the flow of hydraulic pressure to the motor 147 so that the rate of operation of the motor is maintained at a creep speed during the interval when the limit switch 170 is actuated by the dog 167. Forward unitary movement of the slides 98 and 142 is limited by a forward limit switch 171 which is actuated by the dog 167 when the slides arrive at their combined forwardmost position to terminate operation of the motor 147 and thereby stop the forward movement of the slides.

The movement of the slides 98 and 142 serves to engage the clutch element 103 with the clutch element 102 of the selected spindle to complete the driving connection from the hydraulic motor 95 for rotating the spindle, and the movement of the slides 98 and 142 further functions to position the selected spindle for performing a machining operation. The simultaneous movement of the slides 98 and 142 by operation of the motor 147 also serves to feed the operating spindle for a counterboring operation, and as previously mentioned, the additional movement of the feed slide 98 relative to the positioning slide 142 serves to feed a selected spindle 80 in a drilling operation. In order to perform these functions, it is necessary for the slides to be coupled to the quills 81 and 83, and to this end a pair of rods or bars 179 and 180 are slidably supported within suitable bores formed in the feed slide 98 beneath the transmission housing 97 as best shown in Figs. 3 and 7. The rods 179 and 180 are located in the same horizontal plane, in the manner depicted in Fig. 3, but in order to more clearly illustrate the construction, the two rods have been vertically displaced in Fig. 7 so that both rods and their relationship relative to each other may be clearly seen.

The rod 179 is slidably disposed within the bore formed in the feed slide 98 and extends through the feed slide and beyond its rearmost surface where a nut 181 is threaded onto its rear end. The nut 181 serves to retain a washer 182 on the rod to provide a bearing surface for one end of a compression spring 183 with the forward end of the spring 183 bearing against the surface of the feed slide 98 as clearly shown in Figs. 2 and 3. The spring 183 therefore serves to urge the rod 179 in a rearward direction to force its end into engagement with the surface of the back plate 150 and operates to retain the end of the rod 179 in engagement with the surface of the back plate 150 during the initial forward movement of the slides 98 and 142 so that the first portion of the combined forward movement of the two slides is relative to the rod 179 for reasons to be subsequently described.

The rod 180 is likewise slidably supported within a bore formed in the feed slide 98 but its rear end is attached to the positioning slide 142 by means of a pin 184. The rod 180 will therefore always move with the positioning slide 142.

The rods 179 and 180 serve as links for coupling the inner quill 81 and the outer quill 83 respectively to the slides 98 and 142 respectively, and are coupled to the quills by means of rollers 189 and 190 respectively. The roller 189 is adapted to be received within a slot 191 formed in the forward portion of the rod 179 as best shown in Fig. 7 while the roller 190 is adapted to be received within a slot 192 formed in the forward portion of the rod 180.

The roller 189 is rotatably supported by a depending bracket 193 that is attached to the periphery of the inner quill 81 by suitable screws. As a result, when the roller 189 is disposed within the slot 191, the inner quill 81 is coupled to the rod 179 for movement therewith. In like manner, the roller 190 is rotatably supported by a depending bracket 194 that is secured to the outer quill 83. The outer quill 83 is therefore coupled to the rod 180 when its associated roller 190 is disposed within the slot 192 of the rod 180. It is therefore apparent that axial movement of the rods 179 and 180 will effect a like movement of the inner quill 81 and the outer quill 83 respectively. Each of the several inner and outer quills 81 and 83 that are located within the bores 26 are provided with the rollers 189 and 190 for engagement with the slots 191 and 192 of the rods 179 and 180. The rollers enter the slots 191 and 192 when the drum 25 is indexed and moves a drilling or counterboring spindle 80 into operating position to couple the operative spindle with the rods 179 and 180 and thereby with the slides 98 and 142. Indexing of the drum 25 cannot take place until the slides 98 and 142, and therefore the rods 179 and 180 and the quills 81 and 83 are in their fully retracted position.

When the quills 81 and 83 are in their fully retracted position as illustrated in Fig. 3, the rollers 189 and 190 are in alignment with an annular track generally identified by the reference numeral 201 and illustrated in Figs. 2, 5 and 6. The track 201 presents an annular channel 202 for receiving the rollers 189 and 190 when they are moved out of their operative position by rotation of the drum 25. The track 201 is mounted on the saddle 20 so that it is fixed relative to the spindles, and when the rollers 189 and 190 are disposed within the channel 202, the latter serves to prevent lateral movement of the rollers and thereby retains the quills and their associated spindles in the fully retracted position. In order to permit the axial movement of a spindle at the operating station, a front wall of the channel 202 is interrupted to form an opening 203 shown in Fig. 5 and which coincides with the operating position of the spindles. The opening 203 provides clearance for the forward movement of the two rollers 189 and 190 which are associated with a spindle which has been located by the drum 25 at the operating station.

As shown in Fig. 6, a back wall 205 of the channel 202 is provided with an opening 206 opposite the opening 203 to provide clearance to the rear of the spindle for the operation of the clutch 101 and the rods 179 and 180 as well as for the upper portion of the feed slide 98 and the transmission 96. An access opening 207 is also provided in the back wall 205 displaced from the opening 203 for the purpose of withdrawing and replacing the spindles and their associated quills from the bores 26 of the drum 25. The access opening 207 is closed during operation of the machine by a cover plate 212 that is secured to the track 201 by screws 213. When replacement of a spindle in one of the bores 26 is required, the drum 25 is indexed until the spindle to be replaced is in alignment with the opening 207. With the cover plate 212 removed, the spindle and its associated quills may then be withdrawn from the bore 26 through the opening 207.

When the indexing of the drum 25 moves one of the spindles into the operating station, its associated rollers 189 and 190 move into the slots 191 and 192 to couple the inner and outer quills 81 and 83 to the rods 179 and 180 respectively. The hydraulic motor 147 is then actuated to effect a positioning movement of the feed slide 98 and positioning slide 142 simultaneously, and since the rod 180 is connected to the positioning slide 142 by means of the pin 184 it will move with the slide and thereby will cause a like positioning movement of the outer quill 83 by reason of its connections therewith through the placement of the roller 190 in the slot 192.

However, since the rod 179 is slidably supported by the feed slide 98 and is retained in its rearmost position by the action of the spring 183, the rod 179 will not move with the initial movement of the two slides but will remain stationary, and since the inner quill 81 is coupled to the rod 179 by means of the roller 189, it too will remain stationary. Because the transmission 96 is mounted on the feed slide 98, its associated clutch element 103 will move with the feed slide toward the clutch element 102 until the clutch elements 102 and 103 are fully engaged to form a driving connection from the hydraulic motor 95 to the spindle 80.

During this initial movement of the two slides, and until the clutch elements 102 and 103 are fully engaged, the limit switch 170 will be actuated by the dog 167 to insure that the hydraulic motor 147 is operated at creep speed. It is not until the clutch elements 102 and 103 are fully engaged that the limit switch 170 is released by the dog 167 to permit further movement at a rapid rate if desired. However, while the limit switch 170 is actuated by the dog 167, the electrical control circuit is so conditioned, as will be subsequently described, that a rapid rate of movement of the slides 98 and 142 cannot occur.

As a precaution, to prevent further operation of the machine if by some reason the clutch elements 102 and 103 do not move into complete engagement, a limit switch 208 is fixed to the feed slide 98 and connected in the electrical control circuit to prevent further operation of the machine if it is not actuated by engagement of the clutch elements 102 and 103. The limit switch 208 is actuated by moving a spring urged rod 209 to the right as viewed in Fig. 3, against the pressure of a spring 210. The rod 209 is normally urged to its extreme leftward position by the spring 210 and when the clutch elements 102 and 103 become engaged, the bracket 193 abuts the left end of the rod 209 and forces it rightwardly against the pressure of the spring 210 to move an enlarged portion 211 into engagement with the plunger of the limit switch 208 to actuate the limit switch and indicate that proper engagement of the clutch elements 102 and 103 has occurred so that operation of the machine can continue.

After the clutch elements 102 and 103 are fully engaged, it is no longer necessary for the inner quill 81 to remain stationary and it is desired to then effect its forward movement. The front surface of the feed slide 98 will then contact the roller 189 so that further forward movement of the feed slide 98 will cause a like movement of the roller 189 and thereby effect a corresponding movement of the inner quill 81 so that it will then move together with the outer quill 83. Therefore, after the front surface of the feed slide 98 contacts the roller 189, the combined cross positioning movement of the feed slide 98 and the positioning slide 142 will produce a corresponding combined forward positioning movement of the inner quill 81 and the outer quill 83.

During a drilling operation there may be a tendency for the drill to pull the inner quill 81 forwardly relative to the feed slide 98 but this may be avoided by positively coupling the inner quill 81 to the feed slide 98 after the clutch elements 102 and 103 are engaged and after the front surface of the feed slide 98 is in engagement with the roller 189. To this end, the rod 179 which is associated with the inner quill 81 is coupled to the feed slide 98 by means of a vertical plunger 215 that is slidably retained within a vertical bore 216 formed in the feed slide 98 as clearly shown in Figs. 2 and 3. A roller 217 is rotatably carried by the plunger 215 so that its periphery extends above the upper extremity of the plunger while a similar roller 218 is likewise rotatably carried by the plunger 215 so that its periphery extends beyond the lower extremity of the plunger 215. A recess 219 is formed in the way 143 for receiving the lower roller 218 of the plunger 215 when the feed slide 98 and its associated positioning slide 142 are in the fully retracted position. When the roller 218 is within the recess 219 the upper roller 217 is disposed directly beneath the periphery of the rod 179.

When the roller 218 is located within the recess 219, the plunger 215 is in its depressed position so that the roller 217 is directly beneath and out of engagement with the rod 179. The purpose of the plunger 215 is to couple the rod 179 to the feed slide 98 immediately after the front surface of the feed slide 98 contacts the roller 189 to effect a positive coupling of the quill 81 to the feed slide 98 so that the operating drill can not pull the inner quill 81 forwardly relative to the feed slide 98.

To this end, the lower roller 218 moves with the feed slide 98 into contact with an inclined wall 220 after the front surface of the feed slide 98 has contacted the roller 189. Continued movement of the feed slide 98 causes the inclined wall 220 to move the roller 218 and its associated plunger 215 upwardly to move the upper roller 217 into a recess 221 formed in the rod 179. The lower roller 218 then moves out of the recess 219 and rolls along the way 143 to retain the upper roller 217 within the recess 221 for the purpose of positively coupling the rod 179 to the feed slide 98. Such coupling of the rod 179 to the feed slide 98 is maintained until the feed slide 98 is again retracted to permit the roller 218 to drop into the recess 219 which causes the plunger 215 to drop to its depressed position.

If the clutch elements have become properly engaged the hydraulic motor 147 will continue to operate to effect the simultaneous forward movement of the feed slide 98 and the positioning slide 142, and since the roller 189 disposed within the slot 191 of the rod 179 is in contact with the front surface of the feed slide 98, both rods 179 and 180 will move with the slide to cause a like forward simultaneous movement of the inner quill 81 and the outer quill 83 for the purpose of properly positioning the guide 89 with the spindle and its associated cutter for performing a machining operation. The outer quill 83 is provided to accommodate the guide 89 which is required for drilling operations. It will be noted that during the positioning movement the outer quill 83 moves with the inner quill 81 so that the guide 89 will be positioned adjacent to the workpiece and the feeding movement of the drill will then occur relative to the guide 89 by actuating the inner quill 81 forwardly relative to the outer quill 83. Forward movement of the slides 98 and 142 can continue at either a rapid rate or a creep rate until the dog 167 actuates the forward limit switch 171 to terminate operation of the motor 147 although such movement may be terminated sooner either manually or automatically as in response to a signal from a record.

If a counterboring operation is being performed, the feeding of the counterboring tool into the workpiece is effected by the operation of the hydraulic motor 147 at a creep speed to cause the simultaneous forward movement of the feed slide 98 and the positioning slide 142 to move both quills 81 and 83 forwardly and thereby produce a forward movement of the spindle 80 and its associated counterboring cutter. However, if a drilling operation is being performed, the simultaneous movement of the feed slide 98 and the positioning slide 142 functions to position the guide 89 and the drill relative to the workpiece without actually feeding the drill into the workpiece. Such drill feeding movement is produced by admitting hydraulic pressure into the right end of the cylinder 160 to force the piston 158 to the left as viewed in Figs. 2 and 3. Such leftward movement of the piston 158 will serve to actuate the feed slide 98 relative to the positioning slide 142 in a forward direction, and since the roller 189 which is carried by the inner quill 81 has been engaged by the front surface of the feed slide 98, the inner quill 81 will move forwardly with the feed slide 98 relative to the outer quill 83 for feeding the drill 88 into the workpiece. Such feeding movement of the feed slide 98 may continue until the piston 158 has reached its leftward limit of travel within the cylinder 160 although it may be terminated sooner either manually or automatically as in response to a suitable signal from a record when the desired depth of drill feeding has been achieved. The feeding movement will then have been completed and the drill 88 may be withdrawn from the workpiece.

Withdrawal of the drill 88 from the workpiece is produced by reversing the flow of hydraulic pressure into the cylinder 160, to cause a rightward movement of the piston 158 and thereby effect a like movement of the feed slide 98 toward the positioning slide 142. The piston 158 will be moved to its extreme rightward location within the cylinder 160, and the hydraulic pressure on the left side of the piston 158 will be maintained for the purpose of coupling the feed slide 98 to the positioning slide 142 so that the two slides will then move as a unit in response to operation of the hydraulic motor 147.

When the piston 158 arrives at its rightward limit of movement within the cylinder 160 to fully retract the feed slide 98 toward the positioning slide 142, a limit switch 225 will be actuated to indicate that the retracting movement has been completed and condition the electrical circuit for subsequent operation. The limit switch 225 is carried by the feed slide 98 for movement therewith and is actuated by an enlarged portion 226 on a rod 227 that is likewise carried by the feed slide 98. The rod 227 is urged to the right, as viewed in Fig. 3, by a spring 228 to force the enlarged portion 226 out of engagement with the plunger of the limit switch 225. However, when the feed slide 98 is fully retracted, the right end of the rod 227 will abut the positioning slide 142 in the manner illustrated in Fig. 3, causing a leftward movement of the rod 227 against the force of the spring 228 to cause the enlarged portion 226 to engage the plunger of the limit switch 225 and force it downwardly for actuating the switch.

Actuation of the limit switch 225 by the enlarged portion 226 indicates that the retraction of the feed slide 98 is completed. The hydraulic motor 147 may then be operated in a reverse direction to cause a further retraction of the feed slide 98 simultaneously with the retraction of the positioning slide 142. Such retracting movement of the two slides operates to likewise retract the inner quill 81 and the outer quill 83 until the rollers 189 and 190 are in alignment with the track 201 so that subsequent indexing of the drum 25 may occur to position another spindle in the operating location. After the inner quill 81 is fully retracted, the retracting movement of the feed slide 98 and the positioning slide 142 continues to fully retract the outer quill 83. At the same time the roller 218 of the plunger 215 enters the recess 219 to depress the plunger 215 for releasing it from the rod 179 and thereby permit further retraction of the feed slide 98 relative to the rod 179.

The continued retracting movement of the feed slide 98 with the positioning slide 142 then serves to move the clutch element 103 rearwardly and out of engagement with the clutch element 102 to disconnect the spindle 80 from its driving connection with the hydraulic motor 95. Therefore, when the slides 98 and 142 arrive at their fully retracted position, the quills 81 and 83 will likewise be fully retracted so that their associated rollers 189 and 190 are in alignment with the track 201 and the clutch elements 102 and 103 will be fully disengaged to permit an indexing movement of the drum 25 to bring another spindle into operating position.

In order to indicate the distance of movement of the positioning slide 142 relative to the saddle 20, a scale 235 is mounted along the lower edge of the positioning slide 142 to cooperate with a plate 236 that is carried by the saddle 20 to indicate the distance of movement of the positioning slide 142 relative to the saddle 20. In like manner, a scale 237 is mounted on the feed slide 98 to cooperate with a plate 238 that is carried by the positioning slide 142 to indicate the distance of movement of the feed slide 98 relative to the positioning slide 142. In the event that the machine is arranged for automatic operation under the control of a record or other positioning mechanism, the scales 235 and 237 may be replaced by magnetic scales or similar components that cooperate with reading heads. The reading heads would replace the plates 236 and 238 and operate with the magnetic scales to produce electrical impulses or the like for each small increment of movement of the positioning slide 142 and the feed slide 98 for cooperating with a suitable electrical control circuit for regulating the operation of the two slides in well known manner.

The operation of the mechanism has been described in connection with a drilling or counterboring operation in which a spindle 80 is utilized for rotatably supporting the drilling or counterboring tool. As previously mentioned, the particular exemplary embodiment illustrated in the drawings is also adapted to be utilized for performing tapping operations, and because of difference in a tapping operation from a drilling or counterboring operation, the spindle and quill arrangement carried within the bores 26 of the drum 25 must be modified to accommodate the operation of the tapping tool.

Such tapping spindle and quill arrangement is illustrated in Fig. 4 and comprises a tapping spindle generally identified by the reference numeral 245. The tapping spindle 245 is rotatably supported within a single quill 246 that is slidably carried within one of the bores 26 of the drum 25. It is to be noted that the single quill 246 is employed with a tapping spindle 245 and the roller 189 is carried by the single quill 246, while the two quills 81 and 83 are required for operation with a drilling and counterboring spindle 80. The tapping quill 246 is provided with a key 247 that is secured to the periphery of the quill by suitable screws 248 and is disposed within the slot 86 formed in the drum 25 contiguous with the bore 26.

The tapping spindle 245 includes a conventional tool retaining chuck 250 at its forward end for removably securing a tapping tool 251 to the forward end of the spindle. The opposite end of the spindle 245 is provided with a splined portion 252 for engagement with a cooperating spline formed in a drive sleeve 253. The sleeve 253 is rotatably supported within the quill 246 by a pair of ball bearings 254 and the clutch element 102 is secured to the sleeve 253 rather than directly to the spindle. The power from the hydraulic motor 95 is therefore transmitted through the clutch 101 to the sleeve 253 which, in turn, operates to drive the spindle 245 by reason of its connection therewith through the splined portion 252, the spindle being axially movable relative to the sleeve 253 without interrupting the drive connection by reason of the splined engagement therewith.

The spindle 245 is also rotatably carried within the quill 246 by a ball bearing 260 that is mounted for movement with the axial movement of the spindle. The inner race of the ball bearing 260 is disposed between a flange 261 and a collar 262 both of which are secured to the spindle. The outer race of the ball bearing 260 is disposed within an annular bracket 263 which is provided with a tongue 264 that is received within an elongated keyway 265 which serves to prevent rotational movement of the bracket 263 while permitting it to move axially with the movement of the spindle 245. The axial movement of the bracket 263 and its associated ball bearing 260 with the spindle 245 is effected by reason of the location of the inner race of the ball bearing 260 between the flange 261 and collar 262.

In performing a tapping operation, the axial movement of the spindle 245 for each revolution of the spindle must be accurately maintained in order to conform to the thread that is being formed by the tapping tool 251. Therefore, the spindle 245 is provided with a threaded portion 269 that is in engagement with a nut 270. The feeding movement is effected by rotating the spindle 245 and its associated threaded portion 269 relative to the nut 270 to produce a forward axial motion of the spindle 245. The nut 270 is provided with a pair of tongues 271 that extend from diametrically opposite points on the periphery of the nut into the keyway 265 and a keyway 272 to prevent rotation of the nut 270 while permitting it to move axially within the quill 246.

The tongues 271 bear against the ends of the keyways 265 and 272 and are yieldably retained in engagement with the ends of the keyways by a spring 273 which has one end bearing against the end of the nut 270 and its opposite end bearing against the face of a collar 274 that is threadedly engaged within the bore of the quill 246 to compress the spring 273 sufficiently for retaining the tongues 271 of the nut 270 in engagement with the ends of the keyways 265 and 272 with enough force to resist the normal forces developed during tapping operations. However, if the tapping tool should strike an obstruction, the axial force on the nut 270 will increase substantially to overcome the pressure of the spring 273 and move the nut 270 rearwardly within the quill 246.

The lower tongue 271 of the nut 270 is disposed adjacent to a spring urged plunger 279 which is urged upwardly by its cooperating spring into the keyway 265 adjacent to the normal operating position of the lower tongue 271 of the nut 270. If the tapping tool 251 strikes an obstruction to move the nut 270 rearwardly within the quill 246, the tongue 271 will move with the nut to engage the plunger 279 and depress it to produce a like downward movement of a spring urged plunger 280 for actuating a tapping safety switch 281 which is carried within a bracket 282, and serves to prevent further forward feeding movement of the spindle 245 when actuated. The bracket 282 is secured to the feed slide 98 to move with it and extends forwardly therefrom. In addition to the safety switch 281, the bracket 282 carries a forward limit switch 283, a reverse limit switch 284, and a spindle identification switch 285.

The plungers of the switches 281, 283, 284 and 285 are in axial alignment for actuation by the plunger 280, a spring urged plunger 286, a spring urged plunger 287 and a spring urged plunger 288 respectively which are also mounted in the bracket 282. The plungers 280, 286, 287 and 288 are carried for sliding axial movement by the upper portion of the bracket 282 and are urged upwardly by their cooperating springs to release their associated switches. The four plungers carried by the bracket 282 are disposed to be actuated downwardly against the force of their cooperating springs to actuate their associated switches by the downward movement of similar spring urged plungers carried by the tapping quill 246.

Thus, the spring urged plunger 280 is depressed to actuate the safety switch 281 by the downward movement of the plunger 279 when the nut 270 is moved rearwardly as previously described. A pair of similar axially slidable plungers 289 and 290 are spring urged upwardly so that their upper ends extend into the keyway 265 of the quill 246 to be actuated by the tongue 264 of the annular bracket 263. When the spindle 245 reaches its forward limit of movement, the tongue 264 contacts the upwardly extending portion of the plunger 289 to move it downwardly against the force of its cooperating spring to, in turn, depress the plunger 286 and thereby actuate the forward limit switch 283 for stopping further forward feeding movement of the spindle. During reverse rotation of the spindle 245 when retracting the tapping tool 251 from the workpiece, the tongue 264 of the bracket 263 moves within the keyway 265 until it engages the upper extremity of the spring urged plunger 290 and forces the plunger downwardly against the force of its cooperating spring to move the cooperating spring urged plunger 287 downwardly and thereby actuate the reverse limit switch 284 for stopping further reverse rotation of the spindle 245.

The spindle identification switch 285 is actuated by a fixed plunger 291, that is fixedly carried by the key 247 of the quill 246, whenever the clutch elements 102 and 103 are engaged and a tapping spindle is in operating position, to indicate in the electrical control circuit that a tapping operation is to be performed and condition the electrical control circuit accordingly.

In Fig. 4, the spring urged plungers 280, 286, 287 and 288 are shown slightly offset from the plungers 279, 289, 290 and 291 that are carried by the quill 246 because the clutch elements 102 and 103 are shown as being disengaged. However, as the slides 98 and 142 move forwardly, the bracket 282 moves with the slides and when the clutch elements 102 and 103 become fully engaged, the plungers carried by the bracket 282 are in alignment with the plungers carried by the quill 246 so that downward movement of the plungers carried by the quill 246 will produce a like downward movement of their associated plungers carried by the bracket 282 to actuate their cooperating limit switches.

The operation of the slides 98 and 142 when a tapping spindle is in operating position is identical to the operation described in connection with a drilling and counterboring spindle 80, except that the feed slide 98 is not moved forwardly relative to the positioning slide 142 by the piston 158 as is done to feed a drill into the workpiece. Instead, the spindle 245 is rotated to effect the feeding movement by reason of the engagement of its threaded portion 269 with the nut 270. Thus, when the slides 98 and 142 have moved the clutch element 103 into full engagement with the clutch element 102, the front surface of the feed slide 98 engages the roller 189 which is supported by the quill 246 so that further forward motion of the slides 98 and 142 causes a like forward movement of the quill 246 to bring the tapping tool 251 into operating position relative to the workpiece. The spindle 245 will then be rotated to effect its feeding movement.

Since the quill 246 is moving with the feed slide 98 and the positioning slide 142 after the clutch elements 102 and 103 are engaged by reason of the engagement of the front surface of the feed slide 98 with the roller 189 the bracket 282 being carried by the feed slide 98 will move with the quill 246 at the same rate and the plungers carried by the bracket 282 will therefore remain in alignment with the plungers carried by the quill 246 during the tapping operation so that they may function as described. The four limit switches 281, 283, 284 and 285 operate during tapping operations only, and do not function during any portion of a drilling or counterboring operation.

The hydraulic circuit illustrated in Fig. 8 functions to supply operating pressure and control the operation of the machine. Hydraulic pressure for actuating the piston 108 to shift the transmission 96 into any one of its three speed ranges is obtained from a low pressure pump 301 that draws pressure from a reservoir 302 through a conduit 303 and discharges the fluid into a conduit 304 leading to a spindle motor creep valve 305.

The valve 305 includes a slidable plunger 310 which is normally urged to the left as viewed in Fig. 8 by a spring 311. With the plunger 310 in its normal position as established by the spring 311, the flow of hydraulic pressure from the conduit 304 is blocked by the plunger 310. Energization of a solenoid coil 312 functions to shift the plunger 310 against the pressure of the spring 311 to bring a passage 313 in registration with the conduit 304 and a conduit 314 that carries the pressure from the conduit 304 to a pair of branch lines 315 and 316. The branch line 316 includes a check valve 317 which permits the flow of fluid through the conduit 316 to a conduit 318 for operating the spindle drive motor 95 at a creep speed. The gears in the transmission 96 will therefore be rotated at a slow rate to facilitate the shifting of the gears by operation of the piston 108.

Exhaust fluid from the spindle motor 95 flows into a conduit 323 and thence to a branch line 324 through a flow control or throttle valve 325 which may be adjusted to regulate the rate of operation of the spindle motor 95 at creep speed. From the flow control valve 325 the exhaust fluid flows into a conduit 328 which is connected to a port in the valve 305 that registers with a passage 326 when the plunger 310 is in its rightward position. The passage 326 then communicates with a conduit 327 that connects with a return line 330 which functions to carry exhaust fluid back to the reservoir 302.

A portion of the low pressure fluid in the conduit 314 therefore operates the spindle drive motor 95 at a creep speed while the remaining portion is directed through a range selector valve 335 to the cylinder 109 to actuate the piston 108 for shifting the transmission 96 into one of its three speed ranges. To this end, the branch line 315 carrying the low pressure fluid from the conduit 314 is connected to the valve 335 which may be adjusted for actuating the piston 108 into any one of its three operating positions. The valve 335 includes a slidable plunger 336 which is normally centrally located by a pair of oppositely acting springs 337 and 338 that are located within the bore of the valve 335 and act on opposite ends of the plunger 336.

With the plunger 336 in its normal central position as illustrated in Fig. 8, the flow of low pressure fluid from the branch line 315 flows through a passage 339 formed in the valve plunger 336 as well as through a communicating passage 340 which is likewise formed in the plunger 336 but connects with the passage 339. The low pressure fluid therefore flows through both passages 339 and 340 in the plunger 336 with the pressure from the passage 339 flowing into a conduit 341 and the pressure from the passage 340 flowing into a conduit 342. The conduit 341 communicates with the passage 116 to direct the flow of fluid pressure to the left end of the cylinder 109 as viewed in Fig. 8 while the conduit 342 connects with the passage 115 to carry the low pressure fluid to the right end of the cylinder 109. Since hydraulic pressure of substantially equal value is directed into both ends of the cylinder 109, the piston 108 will be centrally located within the cylinder to shift the transmission 96 to its low speed range in the manner previously described.

The plunger 336 of the valve 335 may be shifted in either direction by energizing either one of a pair of solenoid coils 343 and 344. When the solenoid coil 343 is energized, the plunger 336 will shift to the right to move a pair of parallel passages 345 and 346 into operating position in registration with the conduits 341 and 342. When the passages 345 and 346 are thus located, the hydraulic pressure from the branch line 315 will flow through the passage 346 into the conduit 341 to the left end of the cylinder 109 to move the piston 108 to its rightward position within the cylinder 109 for shifting the transmission 96 to its medium speed range. The exhaust fluid from the cylinder 109 will flow through the passage 115 to the conduit 342 and thence through the passage 345 of the valve 335 into the return line 330 which carries the fluid back to the reservoir 302.

Energization of the solenoid 344, on the other hand, will shift the plunger 336 to the left as viewed in Fig. 8 to bring a pair of passages 352 and 353 into operating position to register with the conduits 341 and 342. When the valve plunger 336 is thus moved to its leftward position, the flow of hydraulic pressure from the branch line 315 will flow into the passage 353 and into the conduit 342 which carries the pressure to the right end of the cylinder 109 to actuate the piston 108 in a leftward direction to the left end of the cylinder 109. This movement of the piston 108 will shift the transmission 96 into its high speed range of operation as previously described. The exhaust fluid from the cylinder 109 will flow into the passage 116 and the conduit 341 and thence into the passage 352 formed in the plunger 336 which directs the exhaust fluid into the return line 330 for carrying it back to the reservoir 302.

It is therefore apparent that the range selector valve 335 serves to control the flow of fluid to cylinder 109 so that the transmission 96 may be shifted into any one of the three speed ranges. Furthermore, the hydraulic circuit is so arranged that the shifting of the transmission cannot occur until the transmission gears are slowly rotated at a creep speed by the spindle drive motor 95 by virtue of the fact that the hydraulic pressure for shifting the piston 108 flows through the spindle motor creep valve 305 which will not admit the flow of hydraulic pressure to the range selector valve 335 until the pressure is likewise directed to the spindle drive motor 95 for actuating it at a creep speed. The rate of movement of the piston 108 may be regulated by adjusting a flow control valve 354 that is connected in the branch line 315 so that the flow of operating pressure to the valve 335 may be regulated for adjusting the rate of movement of the piston 108.

The pressure for actuating the spindle drive motor 95 at a normal operating rate for rotating the tool carrying spindles is derived from a high pressure pump 360 under the control of a spindle motor directional valve 361. The pump 360 draws the fluid from the reservoir 302 through a conduit 362 and then discharges it into a conduit 363 that carries the pressure to the valve 361.

The valve 361 is provided with a slidable plunger 365 that is normally centrally located within the bore of the valve 361 by a pair of springs 366 and 367 that are located within the bore of the valve 361 to exert a pressure on each end of the plunger 365. The central portion of the plunger 365 is provided with a U-shaped passage 368 that registers with two ports in the valve 361 to place the pressure line 363 in direct communication with an exhaust line 369 which is connected to the return line 330 to return the fluid to the reservoir 302. The passage 368 therefore serves to by-pass the hydraulic motor 95 and circulates the hydraulic pressure from the pump 360 directly back to the reservoir 302. However, the motor 95 may be operated in either direction by energizing either one of a pair of solenoid coils 370 and 371 which function to move the plunger 365 to the right or to the left respectively, as viewed in Fig. 8, to direct the fluid pressure to the hydraulic motor 95 for operation in either direction.

When the solenoid coil 370 is energized, the plunger 365 is moved to the right within the bore of the valve 361 to bring two parallel passages 375 and 376 that are formed in the plunger 365 into registration with the pressure line 363 and exhaust line 369 respectively. The pressure from the line 363 will then flow through the passage 375 into the conduit 318 which carries the pressure to the hydraulic motor 95 to operate it in the reverse direction. The exhaust fluid is returned from the motor 95 through the conduit 323 and thence through the passage 376 into the exhaust line 369 to flow into the return line 330 that carries it back to the reservoir 302.

When the solenoid coil 371 is energized, the plunger 365 is moved to the left to place a pair of passages 377 and 378 into communictaion with the pressure line 363 and the exhaust line 369 respectively. The pressure will then flow from the pressure line 363 into the passage 377 and thence to the conduit 323 which carries the pressure to the motor 95 for operating the motor in the forward direction. The exhaust fluid from the motor 95 is returned to the reservoir via the conduit 318, the passage 378, the exhaust line 369 and the return line 330.

The exhaust line 369 includes a check valve 379 which limits the flow of fluid in the line to one direction. The exhaust fluid in the line 369 flows through a flow control or throttle valve 380 which may be adjusted for regulating the flow of fluid through the exhaust line 369 and thereby control the rate of operation of the motor 95 at operating speed. A pressure switch 381 is likewise connected to be actuated by pressure in the exhaust line 369 to serve as a protection for the machine, the pressure switch being electrically connected in the electrical control circuit to stop the forward motion of the feed and positioning slides 98 and 142 during a drilling and counterboring operation while during a tapping operation the direction of rotation of the spindle is reversed to retract it from the workpiece, the pressure switch 381 being actuated by an excessive drop of pressure in the exhaust line 369.

A relief valve 382 is connected to the lines 318 and 323 which lead to the motor 95, the relief valve 382 serving to relieve the pressure in the line in the event that an excessive pressure should build up in the line during the operation. Suitable check valves 383 and 384 being connected in the lines that lead to the relief valve 382 for directing the flow of pressure to and from the valve for either direction of operation of the hydraulic motor 95.

The feeding movement of the feed slide 98 is actuated by high pressure fluid from the pump 360 directed to the cylinder 160 through a feed control valve 390 which operates to control the flow of fluid to the cylinder 160 for actuating the piston 158 in either direction. The feed control valve 390 includes a slidable plunger 391 disposed within the bore of the valve and normally urged to the left end of the bore by a spring 392. When the valve plunger 391 is in its normal position as established by the spring 392 a pair of parallel passages 393 and 394 are in communication with a pressure branch line 395 and an exhaust line 396 respectively. The hydraulic pressure from the pump 360 will then flow into a pressure line 397 to the pressure branch line 395 and thence to the passage 393 in the plunger 391. From the passage 393 the flow of pressure continues through a conduit 398, a rapid traverse flow control or throttle valve 399 and through a check valve 401, and thence into the conduit 162 to flow into the left end of the cylinder 160 for moving the piston 158 to the right to retract the feed slide 98 from its forward position.

It will be observed that the spring 392 normally retains the valve 391 in the position shown in Fig. 8 so that the pressure is maintained on the left side of the piston 158 to couple the feed slide 98 to the positioning slide 142 as previously described so that the feed slide 98 will move with the positioning slide 142 upon actuation of the hydraulic motor 147. Furthermore, since the flow of fluid to the left end of the cylinder 160 is always through the rapid traverse flow control valve 399, the retraction of the feed slide 98 will always occur at a rapid rate of travel as distinguished from a feed rate of travel which is established by a separate feed flow control or throttle valve 405 that may be adjusted to regulate the rate of travel in the drill feeding movement.

The feeding movement of the feed slide 98 is initiated by energizing a solenoid coil 406 to shift the plunger 391 of the valve 390 to the right of the position shown in Fig. 8 and thereby bring a pair of passages 406 and 407 into communication with the pressure branch line 395 and the return line 396 respectively. With the plunger 391 thus positioned by the solenoid coil 406, the pressure from the pump 360 will flow through the pressure line 397, the pressure branch line 395, and thence through the passage 406 into the conduit 163 leading to the righ side of the cylinder 160. The exhaust fluid will return to the reservoir 302 through the conduit 162 and through the feed flow control valve 405 because the check valve 401 will prevent the flow of exhaust fluid directly into the line 398 but admits the flow of fluid in the opposite direction to by-pass the feed flow control valve 405 to enable the feed slide 98 to be retracted at a rapid rate. However, during the feeding movement, the exhaust fluid is compelled to flow through the feed flow control valve so that the feeding movement occurs at the desired feed rate. From the feed flow control valve 405 the exhaust fluid continues through the rapid traverse flow control valve 399 and the conduit 398 into the passage 407 and thence into the exhaust line 396 connecting with a return line 408 to return to the reservoir 302.

The pressure in the line 397 from the high pressure pump 360 also serves to operate the cross positioning motor 147 for simultaneously actuating the feed slide 98 and the positioning slide 142 in their path of movement. The operation of the motor 147 is under the control of a cross positioning directional valve 415. The valve 415 is provided with a slidable plunger 416 located within the bore of the valve and normally located in its central position by a pair of springs 417 and 418 that are disposed on either side of the plunger 416 to center it within the bore of the valve 415.

The plunger 416 is provided with a U-shaped passage 419 that serves to by-pass the motor 147 when the plunger 416 is in its central or neutral position as illustrated in Fig. 8. With the plunger 416 thus located, the pressure from the line 397 enters the valve 415 and flows through the U-shaped passage 419 which directs it into an exhaust conduit 420 that connects with the return line 408 to carry the fluid to the reservoir 302. The exhaust conduit 420 has a creep flow control valve 421 connected in it, the creep flow control valve 421 being adjustable to regulate the rate of operation of the motor 147 at creep speed. The exhaust conduit 420 also includes a rapid traverse flow control valve 422 which is adjustable to regulate the speed of the motor 147 when the motor is being operated at a rapid traverse rate of operation.

The plunger 416 of the valve 415 may be moved to either side of its neutral position by energizing either one of a pair of solenoid coils 427 and 428 for operating the hydraulic motor 147 in either direction. Energization of the coil 428 will function to shift the plunger 416 to the left side of the bore of the valve 415 to bring a pair of parallel passages 429 and 430 that are formed in the plunger 416 into communication with the exhaust conduit 420 and the pressure line 397 respectively. With the passages 429 and 430 thus positioned within the valve 415, the flow of pressure from the line 397 will flow through the passage 430 into a conduit 431 connected to the motor 147 to operate the motor in the reverse direction. The exhaust fluid from the motor 147 will flow into a conduit 432 to the passage 429 of the valve 415 and thence into the exhaust conduit 420 through the creep speed flow control valve 421 and the return line 408 to return to the reservoir 302.

Operation of the motor 147 in the forward direction is achieved by energizing the solenoid coil 427 to shift the plunger 416 to the right of its central position. Such movement of the plunger 416 will serve to bring a pair of passages 433 and 434 into registration with the pressure line 397 and the exhause conduit 420 respectively. The flow of pressure from the line 397 will then proceed through the passage 433 into the conduit 432 connected to the motor 147 to operate the motor 147 in the forward direction. The exhaust fluid from the motor 147 will flow into the conduit 431 to the passage 434 and thence through the exhaust conduit 420 through the creep speed flow control valve 421 to the return line 408 to return to the reservoir 302.

The hydraulic motor 147 may be operated at a rapid rate of operation for actuating the feed slide 98 and the positioning slide 142 at a rapid rate by actuating a creep by-pass valve 435. The creep by-pass valve 435 serves to direct the exhaust fluid from the motor 147 to by-pass the creep speed flow control valve 421 and carry it through the rapid traverse flow control valve 422 so that the rate of operation of the motor 147 is under the control of the rapid traverse flow control valve 422 only.

The creep by-pass valve 435 is provided with a plunger 436 and has a port connected to a conduit 437 and a second port connected to a conduit 438. A spring 439 is disposed within the right end of the bore of the valve 435 to urge the plunger 436 to the left and thereby block the flow of fluid from the conduit 437 to the conduit 438. When the valve is in this condition, the exhaust fluid from the motor 147 will flow through the creep speed flow control valve 421 to limit the rate of operation of the motor to a creep speed.

However, a solenoid coil 440 may be energized to shift the plunger 436 to the right end of the bore of the valve 435 and thereby bring a passage 441 formed in the plunger 436 into registration with the conduit 437 and the conduit 438. The flow of exhaust fluid from the valve 415 will then by-pass the conduit 420 and the creep speed flow control valve 421 and flow through the conduit 437, the passage 441, the conduit 438 and thence through the rapid traverse flow control valve 422 into the return line 408 so that the motor 147 will operate at a rapid rate as established by the rapid traverse flow control valve 422. It is therefore apparent that the hydraulic motor 147 may be operated in either direction at either a creep speed or at a rapid rate.

A relief valve 445 is connected to the conduits 431 and 432 through suitable check valves 446 and 447 to relieve the pressure in the lines if it should build up excessively. With this arrangement, the relief valve 445 will protect the apparatus from excessive pressure in either the conduit 431 or the conduit 432.

Figure 9:
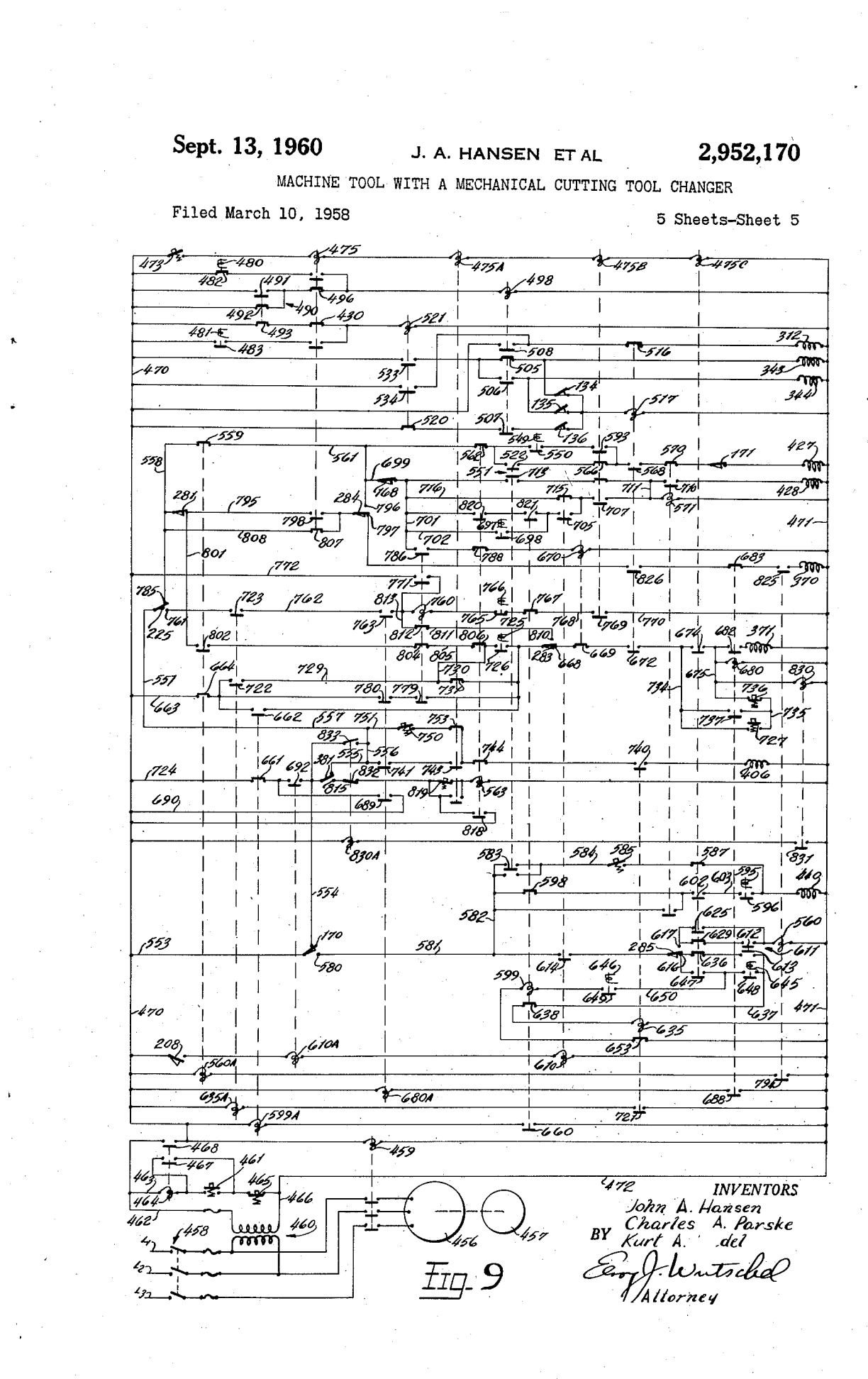

The electrical control circuit for controlling the operation of the machine is illustrated diagrammatically in Fig. 9. In the drawing the relay contact bars are shown in their normal position and are connected to their cooperating relays by a broken line to indicate that they are actuated from their normal position upon energization of their associated relays.

Power for operating the machine is derived from a three phase source represented by the lines $L_1$, $L_2$ and $L_3$ which are connected to energize a pair of motors 456 and 457 through a master switch 458 and the normally open contacts of a relay 459. The control circuit illustrated in Fig. 9 is energized by single phase current obtained from a transformer 460 which has its primary coil connected to the lines $L_1$ and $L_2$ with its secondary coil being connected to supply power to the control circuit.

The control circuit may be energized by closing a push button switch 461 to complete a circuit from one side of the secondary coil of the transformer 460 through a conductor 462 and a conductor 463 to a relay 464. From the relay 464 the circuit continues through the closed start switch 461 and a normally closed stop switch 465 and through a conductor 466 to the opposite side of the secondary coil of the transformer 460 to complete the circuit. Energization of the relay 464 will serve to close its normally open contact bars 467 and 468 and the closing of the contact bar 467 will establish a holding circuit to maintain energization of the relay 464 by by-passing the open start switch 461. The control circuit is de-energized by opening the normally closed stop switch 465. Closing of the contact bar 468 serves to connect one side of the secondary coil of the transformer 460 to a line 470 while the opposite side of the secondary coil is connected to a line 471 through a conductor 472.

As previously mentioned, the machine may be operated manually or automatically under the control of information obtained from a record such as punched or magnetic tape. If the machine is to be controlled automatically from the information on a record, a manual switch 473 is closed to energize four automatic relays 475, 475A, 475B and 475C. Energization of these four relays serves to condition the control circuit for automatic operation in response to information from a record while if the operation is to be controlled manually by the operator, the switch 473 is allowed to remain open.

The initial step in the operation is to select the speed range of the transmission 96 by properly positioning the piston 108 within its cylinder 109 as previously described. This may be accomplished automatically by selective energization of a pair of relays 480 and 481 in response to a suitable signal from a record, the relay 480 having a normally closed contact bar 482 while the relay 481 has a normally open contact bar 483. By energizing one, both, or neither of the relays 480 and 481, either one or neither of the solenoid coils 343 and 344 will be energized to establish either a low, medium or high speed range of operation of the transmission 96.

The speed range of the transmission 96 may also be established manually by manipulating a manual switch generally identified by the reference numeral 490. The manual switch 490 includes three contact bars 491, 492 and 493 which may be closed individually or in combination by manipulation of the switch to obtain the desired speed range. Thus, the low speed range of operation may be obtained by manipulating the switch to close the contact bar 491 only. Closing of the contact bar 491 will complete a circuit from the line 470 to the closed contact bar 491, and a normally closed contact bar 496 of the relay 475. Since the speed range is being selected manually through the switch 490, the relay 475 will not be energized so that its associated contact bar 496 will remain closed. The circuit will then continue from the closed contact bar 496 through a relay 498, completing the circuit through the line 471.

Energization of the relay 498 will serve to open its normally closed contact bar 505 and close its normally open contact bars 506, 507 and 508. With the electrical control circuit thus conditioned, neither the solenoid coil 343 nor the solenoid coil 344 will be energized so that the plunger 336 of the range selector valve 335 will remain in its neutral position directing hydraulic pressure to both sides of the piston 108 to center the piston within the cylinder 109 for establishing the low speed range of operation as previously described.

However, as previously described, in order to obtain a flow of pressure to the cylinder 109 through the valve 335 it is necessary to actuate the spindle motor creep valve 305 by energizing the solenoid 312. Energization of the relay 498 does operate to complete a circuit to the solenoid coil 312 for actuating the valve 305. The current flows to the solenoid coil 312 from the line 470 through the closed contact bar 508 and a normally closed contact bar 516 of a relay 517. From the closed contact bar 516 the flow of electrical current continues through the solenoid coil 312 from whence it returns to its source through the line 471. The solenoid coil 312 is therefore energized to actuate the valve 305 and permit the flow of hydraulic pressure to the motor 95 for driving the transmission at a creep speed as well as to the cylinder 109 through the range selector valve 335 for shifting the transmission to establish the selected low speed range.

When the low speed range is established, the plunger of the limit switch 136 will drop into the notch 132 of the piston 108 as previously described to close the limit switch 136 and thereby indicate that the selected speed range has been established. Closing of the switch 136 serves to complete a circuit from the line 470 to a normally closed contact bar 520 of a relay 521. From the contact bar 520 the flow of current continues through the closed contact bar 507 and the closed switch 136 and thence to the relay 517. From the relay 517 the current returns to its source through the line 471. Completion of this circuit serves to energize the relay 517 and thereby open its normally closed contact bar 516. Opening of the contact bar 516 breaks the circuit to the solenoid coil 312 to cause the spindle motor creep valve 305 to return to its normal position and terminate the flow of hydraulic fluid to the cylinder 109 since the selected low speed range of operation of the transmission 96 has been established.

In similar manner, the medium speed range of operation of the transmission 96 may be established by manipulating the manual switch 490 to close its contact bar 493. The closing of the contact bar 493 will serve to energize the relay 521 by completing a circuit from the line 470 through the closed contact bar 493, a normally closed contact bar 430 of the relay 475, and the relay 521, the flow of current continuing from the relay 521 to return to its source through the line 471. Energization of the relay 521 will cause the opening of its normally closed contact bar 520 and the closing of its normally open contact bars 533 and 534.

Closing of the contact bar 533 will complete a circuit to energize the medium speed range solenoid coil 343, the circuit originating from the line 470 and continuing through the closed contact bar 533, a normally closed contact bar 505 of the relay 498, to the solenoid coil 343 with the current returning to its source from the coil 343 through the line 471. Energization of the coil 343 will serve to shift the plunger 336 of the valve 335 so that the valve will direct fluid pressure to the left end of the cylinder 109 for moving the piston 108 to the right end of the cylinder to establish the medium speed range of operation of the transmission 96.

However, as previously described, in order to obtain a flow of hydraulic pressure to the valve 335 for shifting the piston 108 it is necessary that the spindle motor creep speed valve 305 be actuated to operate the spindle motor 95 at a creep speed and admit hydraulic pressure to the range selector valve 335. The valve 305 is actuated by energizing the solenoid coil 312 and since the relay 521 was energized with the closing of the contact 493, its contact bar 534 will close to complete a circuit for energizing the solenoid coil 312. The current for energizing the solenoid coil 312 flows from the line 470 through the closed contact bar 534 to the normally closed contact bar 516. From the contact bar 516 the flow of electrical current continues through the solenoid coil 312 and returns to its source through the line 471. Upon energization of the coil 312 hydraulic fluid will be admitted to the cylinder 109 for shifting the transmission 96 to its medium speed range of operation.

When the selected medium speed range is obtained, the plunger of the switch 134 will drop into the notch 132 formed on the piston 108 to indicate that the speed range has been established. Closing of the limit switch 134 completes a circuit to energize the relay 517. Energization of the relay 517 serves to open its normally closed contact 516 and thereby break the circuit to the solenoid coil 312 for terminating the flow of hydraulic pressure to the range selector valve 335 and therefore to the cylinder 109 and further operation of the machine may proceed.

If it is desired to operate the transmission 96 in its high speed range, the manual switch 490 is manipulated to close the contact bars 492 and 493. With both of these contact bars closed, the relay 498 and the relay 521 are both energized. Energization of the relay 521 serves to close its contact bar 533 and energization of the relay 498 functions to close its contact bar 506 to complete a circuit to the high speed solenoid coil 344. Thus, the current will flow from the line 470 through the closed contact bar 533, and the closed contact bar 506. From the contact bar 506 the flow of current continues to the solenoid coil 344 and returns to its source through the line 471. Energization of the solenoid coil 344 serves to shift the valve plunger 336 to the left within the bore of the valve 335 to direct fluid pressure to the right end of the cylinder 109 for shifting the piston 108 to the left end of the cylinder to establish the high speed range of operation of the transmission 96.

When the high speed range of operation has thus been established, the plunger of the limit switch 135 will drop into the notch 132 formed on the piston 108 to actuate the switch into its closed position indicating that the high speed range of spindle operation has been established. The closing of the switch 135 will complete a circuit for energizing the relay 517 causing this relay to open its contact bar 516 and break the circuit to the solenoid coil 312 to permit the spindle creep valve 305 to assume its normally closed position and terminate the flow of hydraulic fluid for actuating the piston 108.

It is thus apparent that by manipulating the switch 490 into one of its three positions, the transmission 96 may be shifted to any one of its three speed ranges. This same shifting may be accomplished automatically from information received from recorded data which will serve to energize the relays 480 and 481 in predetermined combinations to complete the electrical control circuits in the same manner as described for operation of the switch 490.

After the transmission 96 has been shifted to the selected speed range, the relay 517 will remain energized and operation of the machine can commence. With the feed slide 98 and the positioning slide 142 in the fully retracted position, a forward positioning signal from the recorded data will energize a relay 549 if the machine is set for automatic operation. Energization of the relay 549 will close its normally open contact bar 550 to complete a circuit for energizing the solenoid coil 427 which functions to actuate the cross positioning directional valve 415 to initiate operation of the motor 147 for positioning the feed slide 98 and the positioning slide 142 in a forward direction. If the machine is being operated manually, the relay 549 will not be energized, but forward positioning can be initiated manually by manipulating a manual switch 551 to close its contact bar 522 which will also serve to complete the circuit for energizing the solenoid 427.

The current for energizing the solenoid 427 flows from the line 470 into a conductor 553 to the limit switch 170. Since the limit switch 170 is being initially actuated by the dog 167 to retain the motor 147 in creep speed, the current will flow from the switch 170 into a conductor 554 to the pressure switch 381. The pressure switch 381 is likewise actuated by reason of the fact that there is hydraulic pressure in the hydraulic exhaust conduit 369 so that the pressure switch will conduct the current to a conductor 555 and thence to a conductor 556 and a conductor 557 to the feed limit switch 225. The feed limit switch 225 is also actuated by reason of the fact that the feed slide 98 is in its fully retracted position so that the current flows from the limit switch 225 into a conductor 558 and thence through a normally closed contact bar 559 of a relay 560A. From the contact bar 559 the flow of current continues through a conductor 561 to a normally closed contact bar 562 of a relay 563.

Under automatic operation the current will continue from the contact bar 562 through the closed contact bar 550 of the relay 549. However, under manual operation, the current will flow from the contact bar 562 to the closed contact bar 522 of the manual switch 551. From the contact bar 522 the flow of current continues through a normally closed contact bar 566 of the relay 475B. The current flows from the contact bar 566 through a closed contact bar 568 of the relay 517, the contact bar 568 being closed by reason of the fact that the relay 517 remains energized after the speed range for the transmission 96 has been established. From the contact bar 568 the flow of current continues through a normally closed contact bar 570 of a relay 571 and thence through the closed cross positioning limit switch 171 to the solenoid coil 427, the current returning to its source from the coil 427 through the line 471.

The initial forward movement of the feed slide 98 and the positioning slide 142 must occur at creep speed until the clutch elements 102 and 103 are fully engaged. After the slides have moved sufficiently to engage the clutch elements, the dog 167 will release the limit switch 170 so that its contact bar will engage a contact 580 connected to a conductor 581. It is only when the limit switch 170 is thus released that the solenoid coil 440 can be energized to actuate the creep by-pass valve for operating the feed and positioning slides at a rapid rate. The circuit for energizing the coil 440 originates at the line 470 with the current flowing through the conductor 553, the limit switch 170, the conductor 581 and a conductor 582 to a contact bar 583 of the manual switch 551. When the manual switch 551 is manipulated to initiate forward movement of the feed and positioning slides, the contact bar 583 will move upwardly to bridge its upper cooperating contacts so that the current can flow through the contact bar 583 into a conductor 584.

If the machine is being operated manually, the rapid traverse rate of operation of the feed and positioning slides 98 and 142 is initiated by actuating a push button switch 585 to its closed position so that the current will flow through the switch 585 to a normally closed contact bar 587 of the automatic relay 475C and thence to the solenoid coil 440, the current returning to its source from the coil 440 through the line 471.

If the machine is being operated automatically from recorded data, a signal from the record will energize a relay 595 to close its normally open contact bar 596. Under these circumstances, the manual switch 585 will not be closed but the current will flow from the conductor 582, through a normally closed contact bar 598 of a relay 599 and thence to a contact bar 602 of the relay 475C. Since the machine is set for automatic operation, the relay 475C will be energized to close the contact bar 602 which will carry the current to a conductor 603 and thence through the closed contact bar 596 of the relay 595 to the solenoid coil 440, the current returning to its source through the line 471. Thus, the solenoid coil 440 may be energized either automatically by energization of the automatic relay 595, or manually by closing the push button switch 585, and in either case the creep by-pass valve 435 will be actuated to cause the hydraulic pressure to by-pass the creep speed flow control valve and produce the forward positioning of the feed and positioning slides 98 and 142 at a rapid rate.

Although the release of the limit switch 170 by the dog 167 will permit energization of the solenoid coil 440 for positioning of the feed and positioning slides at a rapid rate, all forward movement of the slides will terminate after the limit switch 170 is released if the clutch elements 102 and 103 are not fully engaged to actuate the clutch limit switch 208. The actuation of the clutch limit switch 208 upon the engagement of the clutch elements 102 and 103 will complete a circuit for energizing a pair of relays 610 and 610A which, in actual practice, are a single relay but are shown as two relays in Fig. 9 for the purpose of clarifying the drawing.

Upon release of the creep limit switch 170 by the dog 167 and the energization of the relay 610 upon closing of the clutch limit switch 208 with the full engagement of the clutch elements 102 and 103, a spindle verification circuit is completed to condition the electrical control circuit for the particular type of machining operation that has to be performed. If the machine is under manual control, a manual switch 611 must be actuated from the neutral position shown in Fig. 9 to set the circuit for a tapping operation or for a drilling and counterboring operation. The manual switch 611 is provided with two contact bars 612 and 613 both of which are shown open in Fig. 9 inasmuch as the switch is depicted as being in its neutral position. If a tapping operation is to be performed, the switch 611 is manipulated to close the contact bar 612 while if a drilling or counterboring operation is to be performed, the switch 611 is manipulated in the opposite direction to close the contact bar 613. When the machine is being operated automatically from recorded data the switch 611 is not manipulated and is allowed to remain in its neutral position as illustrated in Fig. 9.

The quill verification circuit originates in the line 470 with the current flowing through the conductor 553, the contact bar of the switch 170 into the conductor 581 and thence to a closed contact bar 614 of the relay 610, the contact bar 614 being closed by virtue of the fact that the relay has been energized with the closing of the clutch limit switch 208. The flow of current continues from the closed contact bar 614 to the spindle identification switch 285.

The switch 285 is illustrated in Fig. 9 in its normal position with its contact bar engaging a contact 616 to indicate that a drilling or counterboring operation is to be performed. However, as previously described, if a tapping spindle is in the operating station, the plunger 291 on the tapping spindle quill 246 will serve to actuate the switch 285 when the clutch elements 102 and 103 are fully engaged. Actuation of the switch 285 will move its contact from the position illustrated in Fig. 9 to engage its cooperating contact 617 and thereby complete a circuit for energizing a tapping relay 560 to condition the electrical control circuit for a tapping operation. If the machine is set for automatic operation, a normally open contact bar 625 of the relay 475C will be closed by virtue of the fact that the relay 475C is energized when the machine is set for automatic operation. The current for energizing the tapping relay 560 will therefore flow from the contact 617 of the switch 285 through the closed contact bar 625 into the relay 560, the current returning to its source from the relay 560 through the line 471.

If the machine is set for manual operation, the contact bar 625 of the relay 475C will be open but a normally closed contact bar 629 of the relay 475C will remain closed and the current will flow from the contact 617 of the switch 285 through the closed contact bar 629 and the closed contact bar 612 of the manual switch 611 to energize the relay 560. Thus, the tapping relay 560 will be energized to condition the circuit for a tapping operation if a tapping spindle is in operating position and the clutch 101 is engaged, the tapping relay 560 being energized for either manual or automatic operation of the machine.

The spindle identification switch 285 will not be actuated if a drilling or counterboring spindle is in operating position and its contact bar will remain in the position shown in Fig. 9 in engagement with the contact 616. Furthermore, if the machine is under manual operation, and a drilling or counterboring operation is to be performed, the manual switch 611 will be manipulated in a direction to close its contact bar 613 so that a drilling relay 635 will be energized. The current will then flow from the contact 616 of the switch 285 to a normally closed contact bar 636 of the relay 475C, the contact bar 636 remaining closed since the relay 475C is not energized for manual operation of the machine. From the closed contact bar 636 the flow of current will continue through the closed contact bar 613 of the manual switch 611 into a conductor 637 and through a normally closed contact bar 638 of the relay 599 and thence to the relay 635. From the relay 635 the flow of current continues to the line 471 to return to its source. Energization of the relay 635 will condition the electrical control circuit for manually performing either a drilling or counterboring operation.

Although the relay 635 will be energized for manually performing either a drilling or counterboring operation, it will not be energized for automatically performing a counterboring operation but it will be energized for automatically performing a drilling operation. With the spindle identification switch 285 in the position shown in Fig. 9 to indicate that a drilling or counterboring operation is to be performed, in automatic operation either one of two relays 645 or 646 will be energized by a signal from the recorded data to energize either the relay 635 to condition the circuit for an automatic drilling operation or the relay 599 to condition the electrical control circuit for an automatic counterboring operation. The relay 599 is not energized for manually performing a counterboring operation since the feed and positioning movements required in counterboring will all be performed by manually controlling the operation of the machine.

A normally open contact bar 647 of the relay 475C will be closed if the machine is set for automatic operation. Furthermore, if the recorded data produces a signal calling for a drilling operation, the relay 645 will be energized by such signal to close its contact bar 648. The current will then flow from the contact 616 of the switch 285 through the closed contact bar 647 and the contact bar 648 into the conductor 637 and through the normally closed contact bar 638 of the relay 599 to the relay 635 to energize it. From the relay 635 the current will return to its source through the line 471.

If a counterboring operation is called for by the recorded data, the relay 645 will not be energized but the counterboring relay 646 will be energized by the signal produced from the data to close its associated contact bar 649. Closing of the contact bar 649 will serve to by-pass the contact bar 648 of the relay 645 so that the current will flow from the closed contact bar 647 of the relay 475C into a conductor 650, through the closed contact bar 649 to the relay 599. From the relay 599 the current returns to its source through a normally closed contact bar 653 of the relay 635 to the line 471 to complete the circuit for energizing the counterboring relay 599.

After the electrical control circuit has been conditioned by energization of either the relay 560, the relay 599 or the relay 635 as described, cross positioning of the feed and positioning slides 98 and 142 may be continued. The cycle of operation will vary somewhat for each type of machining operation and it will be first assumed that a counterboring operation under automatic control is to be performed.

In the case of counterboring it is desired that the spindle motor be actuated before the forward positioning of the feed slide 98 and the positioning slide 142 occurs. Since the counterboring operation is to be performed automatically under the control of information on a record, the relay 599 will be energized to close its normally open contact bar 660. Closing of the contact bar 660 serves to complete the circuit for energizing a relay 599A causing it to open its normally closed contact bar 661 and close a normally open contact bar 662. It is to be understood that normally the relay 599 and the relay 599A will be combined into a single unit with the several contact bars under the control of a single relay. However, for the convenience of illustration, two separate relays have been shown in the drawings.

With the closing of the contact bar 662 upon energization of the relay 599A, a circuit will be completed to energize the solenoid coil 371 for actuating the spindle motor directional valve 361 to actuate the spindle drive motor 95 in a forward direction. The electrical current for energizing the solenoid coil 371 flows from the line 470 into a conductor 663 to a normally closed contact bar 664 of the relay 560A. From the contact bar 664 the flow of current continues to the closed contact bar 662 and thence to the tapping spindle forward limit switch 283. Since the limit switch 283 is not actuated, its contact bar will be in engagement with its cooperating contact 668 to permit the flow of current through it to the normally closed contact bar 669 of a relay 670. From the contact bar 669 the flow of current will continue to a contact bar 672 of the relay 517 and since the relay 517 was energized when the speed range of the transmission 96 was established, the normally open contact bar 672 will be closed to permit the flow of current therethrough. From the contact bar 672 the current flows to a normally open contact bar 674 of the relay 475C. Again, however, since the machine is set for automatic operation, the relay 475C will be energized to close its contact bar 674. From the contact bar 674, the current flows into a conductor 675 and through a relay 680 and returns to its source through the line 471. Energization of the relay 680 will cause it to close its normally open contact bar 682 to complete the circuit to the solenoid coil 371 for operating the spindle motor in a forward direction. At the same time that the relay 680 closes the contact bar 682 it also opens a normally closed contact bar 683 to break the circuit to the solenoid coil 370 which serves to actuate the directional valve 361 for operating the spindle in a reverse direction. Thus, the solenoid coil 370 cannot be energized while the relay 680 is energized for energizing the solenoid coil 371 for operating the spindle motor in a forward direction.

With the spindle motor 95 operating to rotate the spindle in a forward direction for a counterboring operation, the solenoid coil 427 may be energized to actuate the valve 415 for operating the motor 147 to position the feed slide 98 and positioning slide 142 in a forward direction, such combined forward movement of the feed slide 98 and the positioning slide 142 also serving as a feeding movement in the case of a counterboring operation for feeding the counterboring tool into the workpiece. When the relay 680 was energized to initiate forward rotation of the spindle, it closed an associated normally open contact bar 688 to complete a circuit for energizing a relay 680A. Energization of the relay 680A operates to close its normally open contact bar 689 which serves to complete a circuit for energizing the forward positioning solenoid coil 427.

The circuit for energizing the solenoid coil 427 originates with the line 470 and continues through a conductor 690 to the closed contact bar 689 of the relay 680A. From the closed contact bar the current flows to the contact bar 692 of the relay 610A. The normally open contact bar 692 is closed by virtue of the energization of the relay 610A so that the current continues through the pressure switch 381 and thence through the conductor 555, the conductor 556 and the conductor 557 to the feed reverse limit switch 225. From the switch 225 the current continues through the conductor 558, the closed contact bar 559 of the relay 560A and the conductor 561 to the normally closed contact bar 562 of the relay 563.

Since the counterboring operation is being automatically controlled from a record, the relay 549 will be energized to call for forward positioning movement. The current will therefore flow from the closed contact bar 562 through the closed contact bar 550 of the relay 549 to a closed contact bar 593 of the relay 475B, the contact bar 593 being closed because the relay 475B is energized inasmuch as automatic operation has been established. From the contact bar 593 the current flows to the contact bar 568 of the relay 517, the contact bar 568 being closed since the relay 517 was energized when the spindle speed range was established.

From the contact bar 568 the current flows through the normally closed contact bar 570 of the relay 571 and thence through the closed forward positioning limit switch 171. From the switch 171 the flow of current continues to the solenoid coil 427, returning to its source through the line 471. In this manner, the forward positioning coil 427 is energized to actuate the positioning directional control valve 415 for directing hydraulic pressure to the motor 147 for moving the feed and positioning slides in a forward direction. If it is desired to effect this movement of the feed and positioning slides at a rapid rate for a portion of the movement, this may be accomplished automatically by a signal from the record that energizes the relay 595 to complete the circuit to the solenoid coil 440 as previously described. In like manner, such rapid rate of movement may be effected manually by actuating the manual push button switch 585 to likewise complete the electrical circuit to the solenoid coil 440.

The forward feeding movement of the feed slide 98 and the positioning slide 142 will continue until the desired depth of counterboring has been obtained. At this point, under automatic operation, the relay 549 will be de-energized in response to a signal from the record and a relay 697 will be energized by the recorded data to close its associated contact bar 698. The opening of the contact bar 550 by de-energization of the relay 549 will serve to de-energize the forward positioning solenoid coil 427, while the closing of the contact bar 698 upon energization of the relay 697 functions to complete a circuit for energizing the reverse positioning solenoid coil 428 for actuating the valve 415 to direct hydraulic pressure to the motor 147 for reverse operation of the motor to effect retraction of the feed slide 98 and the positioning slide 142.

The current for energizing the reverse solenoid coil 428 flows from the conductor 561 into a conductor 699 to the closed cross positioning reverse limit switch 168. From the switch 168 the flow of current continues to a conductor 701 and a conductor 702 to the closed contact bar 698 of the automatic relay 697. From the closed contact bar 698 the current continues to a closed contact bar 705 of the relay 610, the contact bar 705 being closed by energization of the relay 610 when the clutch 101 is engaged. From the contact bar 705 the flow of current continues through a contact bar 707 of the relay 475B, the contact bar 707 being closed by energization of the relay 475B when the machine is set for automatic operation. From the contact bar 707 the current continues to the relay 571 and returns to its source through the line 471.

Completion of this circuit serves to energize the relay 571 causing it to close its normally open contact bar 710 and open its normally closed contact bar 570. The current will therefore flow from the contact bar 707 into a conductor 711 and thence through the contact bar 710 through the reverse positioning solenoid coil 428 to return to its source through the line 471. The circuit is therefore completed automatically to energize the reverse positioning solenoid coil 428 to effect a retraction of the feed and positioning slides 98 and 142. The termination of the forward movement of the feed and positioning slides and the initiation of the reverse movement may be effected manually by manipulating the manual switch 551 to open its contact bar 522 and close its contact bar 713. The circuit will then be closed in like manner to energize the reverse positioning coil 428. It will be noted that when the relay 571 is energized for completing the circuit to the coil 428, its normally closed contact 570 is opened to insure that the circuit to the forward positioning solenoid coil 427 is broken.

When the clutch elements 102 and 103 become disengaged by the retraction of the feed and positioning slides 98 and 142, the limit switch 208 will be released to de-energize the relay 610. The contact bar 705 of the relay 610 would then open to break the circuit to the relay 571 for energizing the solenoid coil 428 for retracting the feed and positioning slides. However, a normally closed contact bar 715 of the relay 610 will close to again complete the circuit, the current flowing from the switch 168 to the conductor 701 and a conductor 716 and thence through the closed contact bar 715 to continue as previously described for retaining the solenoid coil 428 in its energized condition. It will be noted, however, that the circuit for energizing the solenoid coil 428 includes the normally closed cross positioning reverse limit switch 168. Therefore, when the feed and positioning slides arrive at their reverse limit of movement, the dog 167 will actuate the limit switch 168 to break the circuit and de-energize the solenoid coil 428 to thereby stop the reverse movement of the feed and positioning slides 98 and 142 to complete the counterboring operation.

In the case of a drilling operation the cycle is slightly different and the quill verification circuit will therefore operate to energize the drilling relay 635 instead of the relay 599 which was energized when a counterboring operation was selected. Energization of the relay 635 will close its normally open contact bar 721 to complete a circuit for energizing an associated relay 635A. Energization of the relay 635A will operate to close its two normally open contact bars 722 and 723. The cross positioning of the feed slide 98 and positioning slide 142 to position a drilling operation will occur in the same manner as occurred for a counterboring operation except that during the positioning movement, the spindle will not be rotating as it was during the counterboring operation.

The electrical circuit for energizing the forward cross positioning coil 427 is the same as existed for a counterboring operation except that the circuit will not originate with the conductor 690 and the contact bar 689 inasmuch as the contact bar 689 will remain open in view of the fact that the spindle motor 95 is not operating. However, the current will flow through a conductor 724 to the contact bar 661 which remains closed in view of the fact that the relay 599A is not energized for a drilling operation. The current will then flow from the closed contact bar 661 to the contact bar 692 and thence proceed through the same circuit previously described to energize the forward cross positioning coil 427 for effecting a forward positioning movement of the feed slide 98 and the positioning slide 142.

In automatic operation the solenoid coil 371 will be energized to initiate rotation of the spindle after the desired positioning of the drilling tool has been obtained by energizing a relay 725 in response to a signal on the record to close a contact bar 726 associated with the relay 725. If the machine is being operated manually to complete the drilling operation, the solenoid coil 371 is energized by manually closing a push button switch 727.

In automatic operation the current for energizing coil 371 will flow from the line 470 into the conductor 663 and the closed contact bar 664 to the closed contact bar 722 of the energized relay 635A. From the contact bar 722 the flow of current will continue to a conductor 729 and a conductor 730 to the closed contact bar 726 of the automatic relay 725. From the contact bar 726 the current will flow into the switch 283 to the closed contact bar 669 and thence through the closed contact bar 672, the latter being closed by energization of the relay 517 when the transmission speed range was established. From the contact bar 672 the current continues to the closed contact bar 674 which was closed by energization of the relay 475C when the machine was set for automatic operation. From the contact bar 674 the flow of current continues into the conductor 675 and through the relay 680 to return to its source through the line 471. Energization of the relay 680 closes its contact bar 682 to complete the circuit to the coil 371 for actuating the valve 361 to initiate forward rotation of the spindle motor 95.

In manual operation the contact bar 726 of the automatic relay 725 will not be closed but will be by-passed by reason of the fact that a contact bar 731 of the relay 475A will remain closed inasmuch as the relay 475A will not be energized since the machine is not set for automatic operation. From the contact bar 731 the current will flow through the switch 283 and will continue as previously described. In addition, the relay 475C will not be energized for manual operation and contact bar 674 is by-passed by the push button switch 727, the current flowing into a conductor 734 to the closed push button switch 727. From the switch 727 the current continues through a manual spindle stop switch 736 to the relay 680, returning to its source through the line 471. Energization of the relay 680 will close its contact bar 737 to establish a holding circuit for maintaining the relay 680 energized after the push button switch 727 is released, the relay being de-energized manually by actuating the manual stop switch 736. Energization of the relay 680 will, as previously described, also close its contact bar 682 to energize the solenoid coil 371 to initiate forward rotation of the spindle motor 95.

In the case of a drilling operation, the forward cross positioning of the feed slide 98 and the positioning slide 142 may continue until the drill guide 89 is properly positioned relative to a workpiece with the limit of forward movement being established when cross positioning forward limit switch 171 is actuated by the dog 167. Actuation of the limit switch 171 will open it and break the circuit to the solenoid coil 427 to terminate further forward movement of the feed slide 98 and positioning slide 142. Normally, however, such positioning movement will be terminated before the limit switch is actuated by the dog 167, with the circuit to the solenoid coil 427 being interrupted by de-energization of the relay 549 in response to a signal from the record, or if the machine is being operated manually, the positioning movement will be terminated by actuating the manual switch 551 to likewise break the circuit to the solenoid coil 427. In either case, the drill guide 89 will be properly located with respect to the workpiece when the cross positioning movement is stopped and the drilling operation may then be performed.

The drill feeding movement is obtained by energizing the solenoid coil 406 to actuate the feed control valve 390 to cause it to direct fluid pressure to the right end of the cylinder 160 for moving the piston 158 to the left as viewed in Fig. 3 and thereby effect a feeding movement of the feed slide 98 relative to the positioning slide 142. The circuit for energizing the solenoid coil 406 is completed when a contact bar 740 is closed by energization of the relay 635 when the drilling operation was selected and by closing a contact bar 741 which was closed when the relay 680A is energized to initiate rotation of the spindle. The feeding movement will therefore be initiated immediately after the spindle rotation begins.

The current for energizing the solenoid coil 406 for automatic operation will flow from the line 470 into the conductor 724 to the closed contact bar 661 and the closed contact bar 692 which was closed when the relay 610A was energized upon actuation of the clutch limit switch 208 when the clutch elements 102 and 103 were engaged. From the contact bar 692 the current continues through the pressure switch 381 into the conductor 555 and thence to the closed contact bar 741 of the relay 680A. From the contact bar 741 the current continues through a closed contact bar 743 of the relay 475A, the contact bar 743 being closed by energization of the relay 475A when the machine was set for automatic operation. From the contact bar 743 the current continues through a normally closed contact bar 744 of the relay 563 and thence to the closed contact bar 740 which, as previously described, was closed upon energization of the relay 635 when a drilling operation was selected. From the closed contact bar 740 the current continues through the solenoid coil 406, returning to its source through the line 471. The solenoid coil 406 will thus be energized to actuate the plunger 391 of the valve 390 for directing hydraulic pressure to the cylinder 160 to initiate a feeding movement of the feed slide 98 for feeding the drilling cutter into the workpiece to perform the drilling operation.

If the machine is being operated manually, the contact bar 743 in the circuit to the solenoid coil 406 will be open but it may be by-passed by manually closing a push button switch 750 so that the current will flow through the conductor 556 and a conductor 751 through the closed manual push button switch 750. From the switch 750 current flow will continue to a normally closed contact bar 753 of the automatic relay 475A. From the contact bar 753 the circuit continues through the contact bar 744 and continues in the manner previously described for automatic operation.

When the desired depth of drilling has been reached under automatic operation, the record will produce a signal to deenergize the automatic relays 645 and 725. Under manual operation the drill feed movement can be terminated by opening the push button switch 750 or by manipulating the switch 611 to its neutral position to de-energize the relay 635. De-energization of the relay 635 will cause it to open its contact bar 721 and thereby also de-energize the relay 635A. De-energization of the relay 635 serves to open its contact bar 740 to break the circuit to the solenoid coil 406 to permit the feed control valve 390 to return to its normal condition for retracting the feed slide from its forward position at a rapid rate. De-energization of the solenoid coil 406 actuates the valve 390 so that it directs fluid to the left side of the piston 158 within the cylinder 160 to retract the feed slide at a rapid rate. Such movement of the piston 158 will continue until it reaches its rightward limit of movement within the cylinder 160 to fully retract the feed slide 98.

The circuit to the solenoid coil 371 for initiating rotation of the spindle drive motor 95 was completed through a contact bar 722 which was closed by energization of the relay 635A, the relay 635A being energized when a drilling operation was selected. The relay 635, and therefore the relay 635A are de-energized to stop the feeding movement, as previously described, so that the contact bar 722 will open. However, this will not stop the rotation of the spindle motor, so that it may continue to operate during the withdrawal of the drill from the workpiece because release of the feed reverse limit switch 225 when the feed slide 98 initiated its feeding movement caused energization of a relay 760.

When the limit switch 225 is released by forward movement of the feed slide 98, its contact bar will engage a cooperating contact 761 so that the current in the conductor 557 will flow through the switch 225 to its contact 761 and thence to the contact bar 723. When a drilling operation was called for, the relay 635A was energized to close the contact bar 723 so that the current flows thereto into a conductor 762. Upon energization of the solenoid coil 371 for initiating rotation of the spindle motor 95, the relay 680A was energized to close its contact bar 763 so that the circuit can continue to the relay 760. From the relay 760 the circuit continues through a normally closed contact bar 765 of an automatic relay 766. The current flows from the contact bar 765 through a normally closed contact bar 767 of the counterboring relay 599 and thence to a contact bar 769 of the relay 475B. Since the machine is set for automatic operation, the relay 475B will be energized to close the contact bar 769 and permit the flow of current therethrough into a conductor 770 to return to its source through the line 471. The relay 760 is therefore energized, and upon energization it establishes a holding circuit by closing its associated contact bar 771 to by-pass the contact bar 723, the current flowing from the line 470 into a conductor 772 through the closed contact bar 771 to the relay 760. Therefore, when the contact bar 723 is opened by de-energization of the relay 635A when the feeding movement is terminated, the relay 760 will remain energized through the conductor 772.

Energization of the relay 760 operates to close its normally open contact 779 to establish a new circuit for energizing the solenoid coil 371 to maintain the spindle drive motor 95 operating. Since the relay 680A will be energized upon energization of the relay 680 and the solenoid coil 371 for operating the spindle drive motor 95, its associated contact bar 780 will be closed to complete a circuit from the line 470 to the conductor 663 and thence through the closed contact bar 664 and the closed contact bars 780 and 779 to the switch 283 with the circuit continuing in the same manner as previously described for energizing the solenoid 371. The closing of the contact bars 779 and 780 will therefore maintain the spindle motor 95 operating after the contact bar 722 is opened with de-energization of the relay 635A to terminate the forward feeding movement of the feed slide 98. The motor will therefore continue to operate while the drill is being withdrawn from the workpiece.

When the feed slide 98 reaches its reverse limit of movement, it will actuate the feed reverse limit switch 225 so that the contact bar of the switch will engage its cooperating contact 785 to energize the relay 670 to de-energize the solenoid coil 371 and stop forward rotation of the spindle drive motor 95. The circuit for energizing the relay 670 flows from the contact 785 of the switch 225 through the conductor 558, the contact bar 559, the conductor 561, the conductor 699, the cross positioning limit switch 168, the conductor 701, to a contact bar 786 which was closed upon energization of the relay 760. The current will therefore flow through the contact bar 786 and a normally closed contact bar 788 of the relay 563 and thence to the relay 670. From the relay 670 the flow of current continues to return to its source through the line 471. The relay 670 will thus be energized to open its associated contact bar 669 to break the circuit to the solenoid coil 371 and thereby terminate the operation of the spindle drive motor 95 so that the retraction of the feed slide 98 and the positioning slide 142 by operation of the hydraulic motor 147 will occur while the cutter is not rotating.

The energization of the relay 670 indicates that a drilling operation has been completed. Under automatic control, the relay 766 will be energized by a signal obtained from the record to open its normally closed contact bar 765 to break the circuit to the relay 760. When the relay 760 is thus de-energized, it will open its contact bar 786 to likewise break the circuit to the relay 670 so that the relays 760 and 670 are both de-energized for a subsequent operation. The solenoid coil 428 may then be energized in the same manner as previously described in connection with the counterboring operation to effect a retraction of the feed slide 98 and the positioning slide 142 by reverse operation of the motor 147.

In the case of a tapping operation, the cycle is similar to the cycle for a drilling operation except that the feeding movement is not produced by actuating the feed slide 98 but rather by rotating the tapping spindle 245 relative to the nut 270 so that the feed per revolution of the spindle conforms to the pitch of the thread that is to be produced. The clutch elements 102 and 103 become engaged in the same manner as previously described for a counterboring and drilling operation and when they become engaged, the plunger 291 will actuate the limit switch 285 to indicate that a tapping operation is to be performed and the relay 560 will therefore be energized in the manner previously described.

Energization of the relay 560 closes its contact bar 794 to complete a circuit for energizing the relay 560A to open the contact bar 559. In drilling and counterboring operations the circuit for energizing the solenoid coil 427 to produce forward cross positioning of the feed and positioning slides 98 and 142 included the closed contact bar 559. However, since the contact bar 559 is opened during a tapping operation, the current will flow through the switch 281, a conductor 795 and a closed contact bar 798 of the automatic relay 475 to the tapping reverse limit switch 284. When the clutch elements 102 and 103 were engaged, the plunger 290 actuated the switch 284 so that its contact bar engages a contact 796. The circuit to the forward cross positioning coil 427 is therefore completed through the limit switch 284 so that forward cross positioning of the feed slide 98 and the positioning slide 142 may proceed to position the tapping tool adjacent to a workpiece for performing a tapping operation. If, for any reason, the tapping spindle 245 should not be in its fully retracted position within the quill 246, the tapping reverse limit switch 284 will not be actuated, of course, and its contact bar will engage a cooperating contact 797. With the switch 284 in this position, a circuit will be completed to the coil 370 for effecting reverse rotation of the spindle 245 to effect retraction of the spindle which will continue until the plunger 290 is brought into position to actuate the limit switch 284 so that its contact bar engages its contact 796 to complete the circuit for energizing the forward cross positioning coil 427. When the tool has been properly positioned relative to the workpiece a signal will be received from the record in automatic operation to de-energize the automatic relay 549 and break the circuit to the solenoid coil 427. In manual operation, the cross positioning will be terminated by manipulation of the manual switch 551 to also break the circuit in the manner previously described.

Forward rotation of the tapping spindle 245 to effect the forward feeding movement of the tapping tool 251 is initiated by again energizing the solenoid coil 371 automatically in response to a signal from the record which causes energization of the automatic relay 725 for closing its associated contact bar 726 to complete the electrical circuit to the solenoid coil 371. In manual operation, the solenoid coil 371 is energized by closing the push button switch 727.

The relay 560A is energized during a tapping operation with the relay 560 so that its associated contact bar 664 is open, necessitating a slightly different circuit for energizing the solenoid coil 371 than existed during a drilling operation. In a tapping operation the current for energizing the solenoid coil 371 will flow from the conductor 557 through the feed reverse limit switch 225 into the conductor 558 and thence through the closed tapping safety switch 281 into a conductor 801 to a contact bar 802 which was closed upon energization of the relay 560A. From the contact bar 802 the flow of current continues to a normally closed contact bar 804 of the relay 760 to a normally closed contact bar 806 of the relay 563. From the contact bar 806 the flow of current continues through the closed contact bar 726 which was closed by energization of the relay 725 in response to a signal from the record to initiate forward rotation of the spindle. The circuit then is completed in the same manner as previously described for a drilling operation. If the machine is being manually controlled, the circuit will bypass the open contact bar 726 and flow into the conductor 730 to continue in the same manner as described for a manually controlled drilling operation.

It will be noted from the above description that during a tapping operation the circuit for energizing the solenoid coil 371 to effect forward rotation of the spindle differs from the circuit employed in a drilling and counterboring operation inasmuch as the circuit includes the tapping safety switch 281. The safety switch 281 is included in the circuit to protect the machine in the event that the tapping tool 251 should strike a blind hole or other obstruction. If this should occur, the axial force upon the nut 270 will exceed the normal force existing upon the nut during a tapping operation to overcome the pressure of the spring 273 and the nut 270 will shift axially toward the rear of the quill 246 causing its tongue 271 to engage the plunger 279 for actuating the safety switch 281. Actuation of the safety switch 281 will open the switch and break the circuit to the solenoid coil 371 to stop rotation of the spindle.

The operator will then be required to set the machine to manual operation and when this is accomplished the automatic relay 475 will be de-energized to close its contact bar 807 to complete a circuit to the solenoid coil 370 for effecting reverse rotation of the spindle to retract the tapping tool 251 from the workpiece. To thus energize the coil 370 the current flows from the conductor 558 into a conductor 808 to the closed contact bar 807 and thence to the switch 284. Since the tapping spindle has been rotated forwardly, the contact bar of the switch 284 will be in engagement with its cooperating contact 797. The current will therefore flow from the switch 284 through the closed contact bars 826, 683 and 825 to the solenoid coil 370 to effect reverse rotation of the spindle 245 for retracting it from the workpiece.

Forward rotation of the tapping spindle 245 to effect the feeding movement will continue until the plunger 290 engages the plunger 286 to actuate the tapping forward limit switch 283 to move its contact bar out of engagement with its cooperating contact 668. This breaks the circuit to the solenoid coil 371 to stop forward rotation of the spindle 245 and also breaks the circuit to the relay 680. With the relay 680 de-energized, its associated contact bar 683 closes and since the contact bar of the reverse limit switch 284 was released immediately upon the initiation of forward rotation of the spindle 245 it will be engaging its contact 797. A circuit is therefore completed to the reverse solenoid coil 370 to immediately initiate reverse rotation of the spindle 245 for retracting the tapping tool 251 from the workpiece. The reverse rotation of the tapping spindle 245 will continue until the tapping spindle reaches its reverse limit of movement and causes the plunger 290 to actuate the limit switch 284 to break the circuit to the solenoid coil 370 when rotation of the tapping spindle will stop.

When the tapping forward limit switch 283 was actuated to terminate forward rotation of the tapping spindle 245 its contact bar engaged a cooperating contact 810 to complete a circuit for energizing the relay 760 with the current flowing from the switch 283 through a conductor 811, a normally closed contact bar 812 of the relay 760 and a conductor 813 to the relay 760. When the relay 760 is energized it opens its contact bar 812 but closes the contact bar 771 to establish a holding circuit for maintaining the relay 760 energized in the same manner as occurred during a drilling operation. With the relay 760 energized, its contact bar 786 is closed to also complete a circuit for energizing the relay 670 in the same manner as described for a drilling operation. Energization of the relay 670 opens its associated contact bar 669 to break the circuit to the solenoid coil 371 so that when the switch 283 is released upon initiation of the reverse rotation of the tapping spindle 245 and the contact bar of the switch 283 engages its cooperating contact 668 the circuit to the solenoid coil 371 will not be again completed because of the open contact bar 669 in the circuit. Reverse rotation of the spindle drive motor can then continue even though the forward limit switch 283 has been released.

As previously mentioned, reverse rotation of the spindle 245 will continue until the plunger 290 actuates the reverse limit switch 284 and at this time the tapping tool 251 will be free of the workpiece. Actuation of the reverse limit switch 284 will move its contact out of engagement with the contact 797 to break the circuit to the reverse solenoid coil 370 to stop reverse rotation of the spindle. The contact bar of the switch 284 will then engage its associated contact 796 to close a circuit through the cross positioning reverse limit switch 168 to energize the solenoid coil 428 for initiating reverse cross positioning of the feed slide 98 and the positioning slide 142 which may continue at either rapid rate or a creep rate until the dog 167 actuates the creep limit switch 170 when further reverse movement can occur at a creep rate only. Actuation of the switch 170 will also break the circuit to the spindle verification circuit to de-energize the relay 560 and further retraction of the feed slide 98 and positioning slide 142 will cause disengagement of the clutch elements 102 and 103 to release the clutch limit switch 208. The reverse cross positioning of the slides 98 and 142 will then continue in the same manner as described for a counterboring operation until the limit switch 168 is actuated to establish the rearward limit of movement of the slides.

In the same manner as occurred during a drilling operation, a signal from the record in automatic operation will energize the relay 766 to open its associated contact bar 765 and thereby de-energize the relay 760. De-energization of the relay 760 will open its associated contact bar 786 to likewise de-energize the relay 670. The relays 670 and 760 are therefore de-energized upon completion of the operation to condition them for a subsequent operation. Of course, if the machine is under manual operation, the relays 760 and 670 will not be energized.

The electrical control circuit includes the pressure switch 381 to safeguard against the consequences of overloading and stalling of the spindle motor 95. The pressure switch 381 is connected to be actuated by hydraulic pressure in the exhaust line from the spindle motor 95 as previously described, and if the motor should stall for any reason whatsoever, the pressure in the exhaust line will drop to release the pressure switch 381. Releasing of the pressure switch 381 will break the circuit to the cross positioning solenoid coils 427 and 428 and the contact bar of the pressure switch 381 will engage a co-operating contact 815. This will complete an electrical circuit for energizing the relay 563. Once the relay 563 has been energized, it closes a normally open contact bar 818 to complete a holding circuit through a manual switch 819 for maintaining the energization of the relay 563 even though the pressure should be restored to the pressure switch 381. The relay 563 can then only be de-energized by manually opening the switch 819 to insure that the operator will first remove the difficulty which caused the stalling of the spindle motor before initiating operation of the machine. Energization of the relay 563 will open its normally closed contact bars 744, 806, 788 and 562 to prevent further forward feed of the machine until the difficulty that caused the stalling of the spindle motor is remedied.

Energization of the relay 563 upon the stalling of the spindle motor also closes its normally open contact bar 820 and during a counterboring operation a contact bar 821 will also be closed by virtue of the fact that the relay 599 is energized. Therefore, if the spindle motor 95 frees itself during a counterboring operation, and the pressure is restored to the pressure switch 381 to actuate it, an electrical circuit will be completed through the contact bars 820 and 821 to energize the solenoid coil 428 for effecting a reverse rotation of the motor 147 to retract the feed slide 98 and positioning slide 142. Therefore, once the relay 563 has been energized during a counterboring operation forward cross positioning cannot occur since the contact bar 562 of the relay 563 is open and upon restoration of pressure in the exhaust line the pressure switch 381 will again be actuated but cross positioning will then occur in the reverse direction to retract the slides.

If stalling occurs during a drilling operation, the energization of the relay 563 will cause its associated contact bar 744 to open and thereby break the circuit to the solenoid coil 406 to allow the valve 390 to return to its normal position and cause a retraction of the feed slide 98. The spindle will therefore be free of the workpiece and the feeding movement cannot be effected again until the relay 563 has been de-energized by manually opening the switch 819.

In a tapping operation the stalling of the spindle motor 95 would occur during the feeding movement with the solenoid coil 371 energized for rotating the spindle in the forward direction. Stalling of the spindle would, of course, release the pressure switch 381 to energize the relay 563 and energization of the relay 563 would cause opening of its contact bar 806 to break the circuit to the solenoid coil 371 and stop the forward rotation of the spindle. However, the breaking of the circuit to the solenoid coil 371 also operates to de-energize the relay 680 so that its contact bar 683 will close. A contact bar 825 of the relay 560 is also closed by virtue of the fact that the relay 560 is energized in view of the fact that a tapping operation has been selected. When the relay 563 was energized as the spindle motor stalled it broke the circuit, as previously described, to the solenoid coil 371 to permit the valve 361 to return to its normal neutral position. This immediately restores pressure in the exhaust line to again actuate the pressure switch 381. Therefore, with the pressure switch 381 restored to its actuated position and the contact bars 683 and 825 closed, and a contact bar 826 closed because its cooperating relay 517 was energized when the transmission speed range was established, the circuit is completed to the solenoid coil 370 for actuating the valve 361 in the direction to cause reverse rotation of the spindle motor 95. The tapping tool is therefore automatically withdrawn from the workpiece to enable the operator to remedy the difficulty that was encountered and which caused the stalling of the spindle motor in the feeding movement.

At the moment that the forward rotation of the spindle motor 95 is first initiated the pressure in the hydraulic exhaust line 369 will drop to release the pressure switch 381. As the hydraulic pressure flows through the motor, the pressure in the exhaust line will be restored to again actuate the pressure switch 381. However, it is necessary to prevent energization of the relay 563 during the momentary drop of pressure when the forward rotation of the spindle motor is first initiated.

To this end, a relay 830 is provided in the circuit to be energized whenever the relay 680 and the solenoid coil 371 are energized for initiating forward rotation of the spindle motor. When the relay 830 is energized it closes its normally open contact bar 831 to complete a circuit for energizing an associated timer relay 830A having contacts that will remain actuated only for a moment. Energization of the relay 830A will close its normally open contact bar 833 for a moment and open its normally closed contact bar 832 for a moment. Therefore, when the pressure in the hydraulic circuit drops at the time that forward rotation of the spindle motor 95 is first initiated, the relays 830 and 830A will be energized.

As a result, although the pressure switch 381 will be released by reason of the drop of pressure in the exhaust line 369, the contact bar 833 will be closed for a time interval to permit the electrical circuit to by-pass the pressure switch 381 so that the circuit will not be broken. At the same time, the contact bar 832 will be open for the moment so that the electrical circuit through the relay 563 will be broken and the relay 563 will not be energized when rotation of the spindle motor 95 is started. Such drop in pressure in the exhaust line 369 is momentary only, and actuation of the contact bars 832 and 833 are likewise momentary only so that the contact bars 832 and 833 will return to their normal positions immediately after the spindle motor 95 is operating in its forward direction and the electrical control circuit is conditioned to stop operation of the machine in the event that a stalling of the motor should occur during the machining operation in the manner previously described.

From the foregoing detailed description of the illustrative embodiment set forth herein to exemplify the present invention, it will be apparent that there has been provided an improved machine tool incorporating a mechanical tool changer having a variety of cutting tools immediately available for selective operation with the machine, the machine being arranged to automatically effect a driving connection with the selected tool for rotating it and to position and feed the selected tool relative to a workpiece for completing the machining operation, a unique arrangement of controls being provided to prevent damage to the machine and workpiece.

Although the illustrative embodiment of the invention has been described in considerable detail for the purpose of disclosing a practical operative structure whereby the invention may be practiced advantageously, it is to be understood that the particular apparatus described is intended to be illustrative only and that various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool having an operating station; a source of power; a base; a plurality of quills carried by said base for translational movement; a tool carrying spindle rotatably mounted within each of said quills and movable axially with said quills; positioning means operably connected to selectively locate any of said spindles individually at the operating station to render the selected spindle operative; a roller secured to each of said quills for movement with it; a track mounted on said base in alignment with said rollers when said quills are in their fully retracted position and adapted to receive said rollers as the rollers and their associated quills are moved out of the operating station and thereby serving to secure said rollers for retaining the inoperative quills in their retracted position, said track being interrupted at the operating station to release the roller and its associated quill at the operating station for forward movement; a slide supported by said base for sliding movement in a path parallel to the axes of said spindles and connected to be actuated in its path of movement by said source of power; a bar slidably carried by said slide at the operating station and having a slot for receiving said rollers to couple the quill at the operating station to said bar, the roller of each quill moving individually into the slot as said positioning means moves each of said quills into the operating station; a spring connected to yieldably urge said bar toward its reverse limit of movement; a driven clutch element mounted on each of said spindles for rotation therewith; a driving clutch element supported by said slide and connected to be rotated by said source of power, said driving clutch element being disposed in axial alignment with the driven clutch element on the spindle that is located at the operating station so that as said slide is moved forwardly from its reverse limit of movement it will move relative to said bar and relative to the spindle in the quill that is coupled to the bar by said roller to move said driving clutch element forwardly into engagement with the driven clutch element on the spindle to complete a driving connection from said source of power to said spindle for rotating it, said slide being located in position to move into engagement with said roller after said clutch elements are engaged to cause said roller and its associated quill as well as the spindle supported by the quill to move forwardly with said slide for feeding the spindle and its associated cutting tool forwardly toward the workpiece; and coupling means operably connected to couple said quill to said slide after said slide has engaged said quill, said coupling means operating to prevent the operating cutting tool from drawing its associated quill forwardly relative to said slide; whereby said slide may be moved forwardly to engage said clutch elements and continued forward movement thereafter will operate to feed the spindle at the operating station and its associated cutting tool toward the workpiece.

2. In a machine tool having an operating station; a source of power; a base; a drum having a plurality of bores in spaced relationship with the axes of the bores being located along a circle, said drum being rotatably supported by said base so that said drum may be selectively indexed to locate any of its bores individually at the operating station; a quill slidably carried by each of said bores for axial movement relative to said drum; a tool carrying spindle rotatably mounted within each of said quills to move axially with the sliding movement of said quills; a roller secured to each of said quills for movement with it; a track mounted on said base in alignment with said rollers when said quills are in their fully retracted position and adapted to receive said rollers as the rollers and their associated quills are moved out of the operating station and thereby serving to secure said rollers for retaining the inoperative quills in their retracted position, said track being interrupted at the operating station to release the roller and its associated quill at the operating station for forward movement; a slide supported by said base for sliding movement in a path parallel to the axes of said spindles and connected to be actuated in its path of movement by said source of power; a bar slidably carried by said slide at the operating station and having a slot for receiving said rollers to couple the quill at the operating station to said bar, the roller of each quill moving individually from said track into the slot as said drum moves each of said quills into the operating station; a spring connected to yieldably urge said bar toward its reverse limit of movement; a driven clutch element mounted on each of said spindles for rotation therewith; a driving clutch element rotatably supported by said slide and connected to be rotated by said source of power, said driving clutch element being disposed in alignment with the driven clutch element on the spindle that is located at the operating station so that as said slide is moved forwardly from its reverse limit of movement it will move relative to said bar and the spindle in the quill that is coupled to the bar by said roller to move said driving clutch element forwardly into engagement with the driven clutch element on the spindle to complete a driving connection from said source of power to said spindle for rotating it, said slide being located in position to move into engagement with said roller after said clutch elements are engaged to cause said roller and its associated quill as well as the spindle supported by the quill to move forwardly with said slide for feeding the spindle and its associated cutting tool forwardly toward the workpiece; whereby said slide may be moved forwardly to engage said clutch elements and continued forward movement thereafter will operate to feed the spindle at the operating station and its associated cutting tool toward the workpiece.

3. In a machine tool having an operating station; a source of power; a base; a drum having a plurality of bores in spaced relationship with the axes of the bores being located along a circle, said drum being rotatably supported by said base so that said drum may be selectively indexed to locate any of its bores individually at the operating station; a quill slidably carried by each of said bores for axial movement relative to said drum between a retracted position and a forward position; a tool carrying spindle rotatably mounted within each of said quills and to move axially with the sliding movement of said quills; a roller secured to each of said quills for movement with it; a slide supported by said base for movement in a path parallel to the axes of said spindles and connected to be actuated in its path of movement by said source of power; a bar slidably carried by said slide at the operating station and having a slot for receiving said rollers to couple the quill at the operating station to said bar, the roller of each quill moving individually into the slot as said drum moves each of said quills into the operating station; a spring connected to yieldably urge said bar toward its reverse limit of movement; a driven clutch element mounted on each of said spindles for rotation therewith; and a driving clutch element rotatably supported by said slide and connected to be rotated by said source of power, said driving clutch element being disposed in axial alignment with the driven clutch element on the spindle that is located at the operating station so that as said slide is moved forwardly from its reverse limit of movement it will move relative to said bar and the spindle in the quill that is coupled to the bar by said roller to move said driving clutch element forwardly into engagement with the driven clutch element on the spindle to complete a driving connection from said source of power to said spindle for rotating it, said slide being located in position to move into engagement with said roller after said clutch elements are engaged to cause said roller and its associated quill as well as the spindle supported by the quill to move forwardly with said slide for feeding the spindle and its associated cutting tool forwardly toward the workpiece, whereby said slide may be moved forwardly to engage said clutch elements and continued forward movement thereafter will operate to feed the spindle at the operating station and its associated cutting tool toward the workpiece.

4. In a machine tool having an operating station; a source of power; a base; a drum having a plurality of bores in spaced relationship with the axes of the bores being located along a circle, said drum being rotatably supported by said base so that said drum may be selectively indexed to locate any one of its bores at the operating station; a quill slidably carried by each of said bores for axial movement relative to said drum; a tool carrying spindle rotatably mounted within each of said quills to move axially with the sliding movement of said quills; a slide supported by said base for sliding movement in a path parallel to the axes of said spindles and connected to be actuated in its path of movement by said source of power; a driven clutch element carried by each of said spindles for rotation therewith; a driving clutch element rotatably supported by said slide and connected to be rotated by said source of power, said driving clutch element being disposed in alignment with the driven clutch element on the spindle that is located in the operating station so that said slide may be moved forwardly to engage the driving clutch element with the driven clutch element on the spindle in the operating station to complete a driving connection from said source of power to said spindle for rotating it, said slide being located to move into engagement with the quill at the operating station after said clutch elements are engaged to cause the quill and its associated spindle to move forwardly with said slide for feeding the spindle and its associated cutting tool forwardly toward the workpiece; and coupling means operably connected to couple said quill to said slide after said slide has engaged said quill, said coupling means operating to prevent the operating cutting tool from drawing its associated quill forwardly relative to said slide; whereby said slide may be moved forwardly to engage said clutch elements and continued forward movement of said slide thereafter will operate to feed the spindle at the operating station and its associated cutting tool toward the workpiece.

5. In a machine tool having an operating station; a source of power; a base; a drum having a plurality of bores in spaced relationship with the axes of the bores being located along a circle, said drum being rotatably supported by said base so that said drum may be selectively indexed to locate any of its bores individually at the operating station; a quill slidably carried by each of said bores for axial movement relative to said drum; a tool carrying spindle rotatably mounted within each of said quills to move axially with the sliding movement of said quills; a slide supported by said base for sliding movement in a path parallel to the axes of said spindles and connected to be actuated in its path of movement by said source of power; a transmission supported by said slide for movement therewith, said transmission being connected to be driven by said source of power; a driven clutch element carried by each of said spindles for rotation therewith; and a driving clutch element rotatably supported by said slide and connected to be rotated by said transmission, said driving clutch element being disposed in alignment with the driven clutch element on the spindle that is located in the operating station so that said slide may be moved forwardly to engage the driving clutch element with the driven clutch element on the spindle in the operating station to complete a driving connection from said source of power to said spindle for rotating it, said slide being located in position to move into engagement with the quill at the operating station after said clutch elements are engaged to cause the quill and its associated spindle to move forwardly with said slide for feeding the spindle and its associated cutter forwardly toward the workpiece; whereby said slide may be moved forwardly to engage said clutch elements and continued forward movement of said slide thereafter will operate to feed the spindle at the operating station and its associated cutting tool toward the workpiece.

6. In a machine tool; a base; a plurality of tool carrying spindles; a drum rotatably supporting each of said spindles, said drum being rotatably mounted on said base so that said drum may be selectively indexed to position any one of said spindles at an operating station to render the selected spindle operative; locking means operable when actuated to lock said drum at the selected index position; a slide supported by said base for rectilinear movement relative to said drum; a transmission carried by said slide for movement with it; a source of power connected to drive said transmission; a driven clutch element carried by each of said spindles; a driving clutch element connected to be rotated by said transmission and disposed in alignment with the driven clutch element of the spindle that has been located in the operating station by said drum, said driving clutch element being mounted to move bodily with said transmission so that as the latter is moved forwardly with said slide said driving clutch element will be moved into driving engagement with the driven clutch element of the spindle at the operating station to complete a driving connection from said source of power to the operating spindle for rotating the spindle and its associated cutting tool; and means operably connected to feed the operating spindle and its associated cutter axially toward a workpiece while maintaining said cultch elements in engagement; whereby any of said spindles and their associated cutting tools may be operated selectively for performing a machining operation.

7. In a machine tool having an operating station; a source of power; a base; a carriage slidably supported by said base; a saddle slidably supported by said carriage, said carriage and said saddle being movable in two mutually transverse paths; a plurality of tool carrying spindles carried by said saddle for rotational and translational movement; means operably connected to move said spindles laterally to selectively locate any of said spindles individually at the operating station to render the selected spindle operative; a slide carried by said saddle for movement in a path parallel to the axes of said spindles; a driven clutch element carried by each of said spindles; a driving clutch element rotatably carried by said slide and connected to be rotated by said source of power, said driving clutch element being disposed in alignment with the driven clutch element of the spindle that has been located at the operating station so that said slide may be moved forwardly to move said driving clutch element into driving engagement with the driven clutch element of the spindle at the operating station to complete a driving connection from said source of power to the operating spindle for rotating the spindle and its associated cutting tool; and means operably connected to couple the operating spindle to said slide after the driven clutch element of the operating spindle has been engaged by said driving clutch element so that further forward movement of said slide will cause a like axial movement of the operating spindle for feeding its associated cutter toward a workpiece; whereby any of said spindles and their associated cutting tools may be operated selectively for performing a machining operation.

8. In a machine tool having an operating station; a source of power; a base; a plurality of tool carrying spindles carried by said base for rotational and translational movement; means operably connected to move said spindles laterally to selectively locate any of said spindles individually at the operating station to render the selected spindle operative; a slide carried by said base for movement in a path parallel to the axes of said spindles and connected to be actuated in its path of movement by said source of power; a clutch operably connected to couple the operating spindle to said source of power to complete a driving connection from said source of power to the operating spindle for rotating the operating spindle and its associated cutting tool; means operably connected to couple the operating spindle to said slide so that forward movement of said slide will cause a like axial movement of the operating spindle to move it forwardly from a retracted position for feeding its associated cutter toward a workpiece; and retaining means operably carried by said base to be engaged by the inoperative spindles on said base for retaining the inoperative spindles in their retracted position, the operating spindle being disengaged from said retaining means when it is moved to the operating station so that it is released for forward movement by the operation of said slide.

9. In a machine tool having an operating station; a source of power; an electrical control circuit operably connected to control the transmission of power from said source; a base; a plurality of spindles carried by said base for rotational and translational movement; a cutting tool operably carried by each of said spindles, said cutting tools varying in type for performing different machining operations requiring variations in the operating cycle of the machine; means operably connected to selectively locate any of said spindles individually at the operating station to render the selected spindle operative; a clutch operably connected to couple the operating spindle to said source of power to complete a driving connection from said source of power to the operating spindle for rotating the operating spindle and its associated cutting tool; feeding means connected to be actuated by said source of power and to engage the operating spindle for feeding the operating spindle axially toward the workpiece; a clutch actuated switch connected in said electrical control circuit and arranged to be actuated by the engagement of said clutch, said clutch actuated switch being operable when actuated to condition said electrical control circuit for admitting the transmission of power from said source to said feeding means for effecting a forward movement of the operating spindle toward the workpiece after said clutch is engaged, said clutch actuated switch being operable when released to condition said electrical circuit for interrupting the transmission of power from said source to said feeding means so that said feeding means will not operate to move the operating spindle if said clutch is not engaged; a spindle verification circuit connected in said electrical control circuit and actuatable selectively to condition said electrical control circuit for regulating the transmission of power from said source for effecting different operating cycles of the machine to accommodate the different machining operations performed by said cutting tools; and a spindle indicator switch operably connected to be actuated in response to the type of cutting tool located at the operating station with its associated spindle, said spindle indicator switch being connected in said electrical control circuit to actuate said spindle verification circuit according to the cutting tool at the operating station for conditioning said electrical control circuit to regulate the transmission of power from said source for effecting an operating cycle of the machine which will accommodate the cutting tool at the operating station.

10. In a machine tool having an operating station; a source of power; an electrical control circuit operably connected to control the transmission of power from said source; a base; a plurality of spindles carried by said base for rotational and translational movement; a cutting tool operably carried by each of said spindles, said cutting tools varying in type for performing different machining operations requiring variations in the operating cycle of the machine; means operably connected to move said spindles translationally to selectively locate any of said spindles individually at the operating station to render the selected spindle operative; a slide carried by said base for movement in a path parallel to the axes of said spindles and connected to be actuated in its path of movement by said source of power at a creep rate or at a rapid rate selectively; a driven clutch element carried by each of said spindles; a driving clutch element rotatably carried by said slide and connected to be selectively rotated by said source of power, said driving clutch element being disposed in alignment with the driven clutch element of the spindle that has been located at the operating station so that said slide may be moved forwardly to move said driving clutch element into driving engagement with the driven clutch element of the spindle at the operating station to complete a driving connection from said source of power to the operating spindle for rotating the spindle and its associated cutting tool; means operably connected to couple the operating spindle to said slide after the driven clutch element of the operating spindle has been engaged by said driving clutch element so that further forward movement of said slide will cause a like axial movement of the operating spindle for feeding its associated cutter toward a workpiece; a creep speed limit switch mounted in position to be actuated by the movement of said slide while said slide is moving said driving clutch element into engagement with the driven clutch element of the spindle at the operating station and to be released when said slide has moved sufficiently to move said driving clutch element into full engagement with said driven clutch element, said creep speed limit switch being connected in said electrical control circuit to condition the electrical control circuit for regulating the transmission of power to limit the rate of operation of said slide to a creep rate while said switch is actuated and to operate said slide at either a rapid rate or a creep rate selectively when said switch is released; a clutch actuated switch connected in said electrical control circuit and mounted in position to be actuated by the full engagement of said driving clutch element with said driven clutch element, said clutch actuated switch being operable when actuated to condition said electrical control circuit for admitting the transmission of power from said source for effecting further movement of said slide after said clutch elements are fully engaged for moving the operating spindle toward the workpiece, said clutch actuated switch being operable when released to condition said electrical control circuit for interrupting the transmission of power from said source for actuating said slide to prevent further movement of said slide if said clutch elements are not fully engaged; a spindle verification circuit connected in said electrical control circuit and actuatable selectively to condition said electrical control circuit for regulating the transmission of power from said source for effecting different operating cycles of the machine to accommodate the different machining operations performed by said cutting tools; and a spindle indicator switch operably connected to be actuated in response to the type of cutting tool located at the operating station with its associated spindle, said spindle indicator switch being connected in said electrical control circuit to actuate said spindle verification circuit according to the cutting tool at the operating station for conditioning said electrical control circuit to regulate the transmission of power from said source for effecting an operating cycle of the machine which will accommodate the cutting tool at the operating station.

11. In a machine tool having an operating station; a source of power; an electrical control circuit operably connected to control the operation of said source of power; a base; a plurality of tool carrying spindles carried by said base for rotational and translational movement; means operably connected to move said spindles laterally to selectively locate any of said spindles individually at the operating station to render the selected spindle operative; a slide carried by said base for movement in a path parallel to the axes of said spindles and connected to be actuated in its path of movement by said source of power; clutch means operably connected to couple the operating spindle to said source of power to complete a driving connection from said source of power to the operating spindle for rotating the operating spindle and its associated cutting tool; means operably connected to couple the operating spindle to said slide so that forward movement of said slide will cause a like axial movement of the operating spindle for feeding its associated cutter toward a workpiece; and an electrical switch located in position to be actuated by the engagement of said clutch means and connected in said electrical control circuit, said switch being operable when actuated to condition said electrical control circuit for initiating further operation of the machine so that if said clutch should fail to engage properly said switch will not be actuated and further operation of the machine will be precluded until the clutch is properly engaged.

12. In a machine tool having an operating station; a source of power; an electrical control circuit operably connected to control the operation of said source of power; a base; a plurality of tool carrying spindles carried by said base for rotational and translational movement; means operably connected to move said spindles laterally to selectively locate any of said spindles individually at the operating station to render the selected spindle operative; a slide carried by said saddle for movement in a path parallel to the axes of said spindles and connected to be actuated in its path of movement by said source of power; a driven clutch element carried by each of said spindles; a driving clutch element rotatably carried by said slide and connected to be rotated by said source of power, said driving clutch element being disposed in alignment with the driven clutch element of the spindle that has been located at the operating station so that said slide may be moved forwardly to move said driving clutch element into driving engagement with the driven clutch element of the operative spindle to complete a driving connection from said source of power to the operative spindle for rotating the spindle and its associated cutting tool; means operably connected to couple the operating spindle to said feed slide after the driven clutch element of the operating spindle has been engaged by said driving clutch element so that further forward movement of said slide will cause a like axial movement of the operating spindle for feeding its associated cutter toward a workpiece; and an electrical switch connected in said electrical control circuit and mounted in position to be actuated by the engagement of said driving clutch element with said driven clutch element, said switch being operable when actuated to condition said electrical control circuit for initiating further operation of the machine after said clutch elements are engaged; whereby if said clutch elements fail to engage properly said switch will not be actuated and further operation of the machine will not occur.

13. In a machine tool having an operating station; a source of power; an electrical control circuit operably connected to control the transmission of power from said source; a base; a plurality of tool carrying spindles carried by said base for rotational and translational movement; means operably connected to move said spindles laterally to selectively locate any of said spindles individually at the operating station to render the selected spindle operative; a slide carried by said base for movement in a path parallel to the axes of said spindles and connected to be actuated in its path of movement by said source of power; a driven clutch element carried by each of said spindles; a driving clutch element rotatably carried by said slide and connected to be selectively rotated by said source of power, said driving clutch element being disposed in alignment with the driven clutch element of the spindle that has been located at the operating station so that said slide may be moved forwardly to move said driving clutch element into driving engagement with the driven clutch element of the spindle at the operating station to complete a driving connection from said source of power to the operating spindle for rotating the spindle and its associated cutting tool; means operably connected to couple the operating spindle to said slide after the driven clutch element of the operating spindle has been engaged by said driving clutch element so that further forward movement of said slide will cause a like axial movement of the operating spindle for feeding its associated cutter toward a workpiece; a dog carried by said slide for movement therewith; a creep speed limit switch supported in position to be actuated by said dog while said slide is moving said driving clutch element into engagement with the driven clutch element of the spindle in the operating station and to be released by said dog when said slide has moved sufficiently to move said driving clutch element into full engagement with said driven clutch element, said creep speed limit switch being connected in said electrical control circuit to condition the electrical control circuit for regulating the transmission of power to operate said slide at a creep rate only while said switch is actuated and to operate said slide at either a rapid rate or a creep rate selectively when said switch is released; and a clutch actuated switch connected in said electrical control circuit and mounted in position to be actuated by the full engagement of said driving clutch element with said driven clutch element, said clutch actuated switch being operable when actuated to condition said electrical control circuit for admitting the transmission of power from said source for effecting further movement of said slide after said clutch elements are fully engaged for moving the operating spindle toward the workpiece, said clutch actuated switch being operable when released to condition said electrical control circuit for interrupting the transmission of power from said source for actuating said slide; whereby said creep speed limit switch will limit the movement of said slide to a creep rate until said slide has moved sufficiently to engage said clutch elements, and said clutch actuated switch will prevent further movement of said slide if said clutch elements are not fully engaged.

14. In a machine tool having an operating station; a source of power; an electrical control circuit operably connected to control the transmission of power from said source; a base; a plurality of spindles carried by said base for rotational and translational movement; a cutting tool operably carried by each of said spindles, said cutting tools varying in type for performing different machining operations requiring variations in the operating cycle of the machine; means operably connected to move said spindles laterally to selectively locate any of said spindles individually at the operating station to render the selected spindle operative; a clutch operably connected to couple the operating spindle to said source of power to complete a driving connection from said source of power to the operating spindle for rotating the operating spindle and its associated cutting tool; feeding means operably connected to be actuated by said source of power and to engage the operating spindle for feeding the operating spindle axially toward the workpiece; a spindle verification circuit connected in said electrical control circuit and actuatable selectively to condition said electrical control circuit for regulating the transmission of power from said source for effecting different operating cycles of the machine to accommodate the different machining operations performed by said cutting tools; and a spindle indicator switch operably connected to be actuated in response to the type of cutting tool located at the operating station with its associated spindle, said spindle indicating switch being connected in said electrical control circuit to actuate said spindle verification circuit according to the cutting tool at the operating station for conditioning said electrical control circuit to regulate the transmission of power from said source for effecting an operating cycle of the machine which will accommodate the cutting tool at the operating station.

15. In a machine tool having an operating station; a source of power; a base; a plurality of outer quills carried by said base for axial and lateral movement; an inner quill slidably supported for axial movement within each of said outer quills; a tool carrying spindle rotatably supported by each of said inner quills; positioning means operatively connected to individually locate any of said outer quills and their associated inner quills and spindles at the operating station to render a selected spindle operative; a tool guide mounted at the forward end of each of said outer quills in position to guide the cutting tool carried by said spindles as the spindle and its associated cutting tool are fed forwardly relative to the outer quill for performing a machining operation; an outer quill roller secured to each of said outer quills for movement with it; an inner quill roller secured to each of said inner quills for movement with it; a positioning slide slidably supported by said base for movement in a path parallel to the axes of said spindles and connected to be actuated in its path of movement by said source of power; a feed slide slidably supported by said base for movement in the path of travel of said positioning slide; a cylinder fixed to said positioning slide; a piston slidably contained within said cylinder; a connectnig rod connected at one end to said piston and at its opposite end to said feed slide; a source of hydraulic pressure; a valve connected to receive hydraulic pressure from said source and to direct it to either end of said cylinder selectively for moving said piston and the feed slide to which it is connected in either direction, said valve being normally conditioned to direct fluid to the end of said cylinder for moving said feed slide to its retracted position toward said positioning slide with the hydraulic pressure being maintained in this direction for firmly coupling said feed slide to said positioning slide so that said slides will move together when said positioning slide is actuated by said source of power, said valve being actuatable to reverse the flow of hydraulic pressure to said cylinder for moving said feed slide forwardly relative to said positioning slide in a feeding movement; an inner quill rod slidably carried by said feed slide at the operating station and having a slot for receiving said inner quill rollers to couple the inner quill at the operating station to said inner quill rod, the roller of each inner quill moving individually into the slot as said positioning means moves each of said inner quills into the operating station; a spring connected to yieldably urge said inner quill rod toward its reverse limit of movement; an outer quill rod slidably carried by said feed slide and connected at its rearward end to said positioning slide for movement with said positioning slide, said outer quill rod having a slot at its forward end for receiving said outer quill rollers to couple the outer quill at the operating station to said outer quill rod, the roller of each outer quill moving individually into the slot as said positioning means moves each of said outer quills into the operating station; a driven clutch element mounted on each of said spindles for rotation therewith; and a driving clutch element rotatably supported by said feed slide and connected to be rotated by said source of power, said driving clutch element being disposed in alignment with the driven clutch element on the spindle that is located in the operating station and as said feed and positioning slides are moved forwardly together from their reverse limit of movement, said inner quill with its associated spindle and driven clutch element will remain stationary by operation of said spring retaining said inner quill rod at its reverse limit of movement so that forward movement of said slides will move said driving clutch element into engagement with the driven clutch element on the spindle at the operating station to complete a driving connection for rotating said spindle, and while said clutch elements are being engaged said outer quill will be moving forwardly with said positioning slide to advance said tool guide with respect to the cutting tool, said feed slide being located in position to move into engagement with said inner quill roller after said clutch elements are engaged to cause said inner quill to thereafter move forwardly with said feed slide so that further forward movement of said feed and positioning slides will serve to move said inner quill and said outer quill forwardly simultaneously to position the spindle and its associated cutting tool relative to the workpiece, and said piston may then be actuated to move said feed slide relative to said positioning slide for moving said inner quill with its spindle to feed the associated cutting tool into the workpiece while the outer quill remains stationary to support said tool guide for guiding the cutting tool as it is fed toward the workpiece.

16. In a machine tool having an operating station; a base; a source of power; a plurality of outer quills carried by said base for axial and lateral movement; an inner quill slidably supported for axial movement within each of said outer quills; a tool carrying spindle rotatably supported by each of said inner quills; positioning means operatively connected to individually locate any of said outer quills and their associated inner quills and spindles at the operating station to render a selected spindle operative; a tool guide mounted at the forward end of each of said outer quills in position to guide the cutting tool carried by said spindles as the spindle and its associated cutting tool are fed forwardly relative to the outer quill for performing a machining operation; a positioning slide slidably supported by said base for movement in a path parallel to the axes of said spindles and connected to be actuated in its path of movement by said source of power; a feed slide slidably supported by said base for movement in the path of travel of said positioning slide; feeding means operably connected to actuate said feed slide in a feeding movement relative to said positioning slide; coupling means operably connected to couple said feed slide to said positioning slide so that said feed slide will move with said positioning slide whenever the latter is actuated in its path of movement, said coupling means being automatically released whenever said feeding means is operated for moving said feed slide relative to said positioning slide; an outer quill roller secured to each of said outer quills for movement with it; an inner quill roller secured to each of said inner quills for movement with it; an outer quill rod connected at its rearward end to said positioning slide for movement with said positioning slide, said outer quill rod having a slot at its forward end for receiving said outer quill rollers to couple the outer quill at the operating station to said outer quill rod, the roller of each outer quill moving individually into the slot as said positioning means moves each of said outer quills into the operating station; an inner quill rod slidably carried by said feed slide at the operating station and having a slot for receiving said inner quill rollers to couple the inner quill at the operating station to said inner quill rod, the roller of each inner quill moving individually into the slot as said positioning means moves each of said inner quills into the operating station; a spring connected to yieldably urge said inner quill rod toward its reverse limit of movement; a driven clutch element mounted on each of said spindles for rotation therewith; and a driving clutch element rotatably supported by said feed slide and connected to be rotated by said source of power, said driving clutch element being disposed in alignment with the driven clutch element on the spindle that is located at the operating station and as said feed and positioning slides are moved forwardly together from their reverse limit of movement, said inner quill with its associated spindle and driven clutch element will remain stationary by operation of said spring retaining said inner quill rod at its reverse limit of movement so that forward movement of said slides will move said driving clutch element into engagement with the driven clutch element on the spindle at the operating station to complete a driving connection for rotating said spindle, and while said clutch elements are being engaged said outer quill will be moving forwardly with said positioning slide to advance said tool guide with respect to the cutting tool, said feed slide being arranged to engage said inner quill roller after said clutch elements are engaged to cause said inner quill to thereafter move forwardly with said feed slide so that further forward movement of said feed and positioning slides will serve to move said inner quill and said outer quill forward simultaneously to position the spindle and its associated cutting tool relative to the workpiece, and said feeding means may then be actuated to move said feed slide relative to said positioning slide for moving said inner quill with its spindle to feed the associated cutting tool into the workpiece while said outer quill remains stationary to support said tool guide for guiding the cutting tool as it is fed toward the workpiece.

17. In a hydraulic shifting mechanism for shifting a speed changer to its various speed ranges, a shifting fork connected to shift the speed changer into its several speed ranges when actuated; a piston and cylinder mechanism operably connected to actuate said shifting fork for shifting the speed changer into its several speed ranges; a source of hydraulic pressure; a hydraulic motor operably connected to drive the speed changer; a range selector valve operably connected to selectively direct hydraulic pressure from said source to actuate said piston and cylinder mechanism for shifting the speed changer to a preselected speed range; and a creep valve operably connected to receive hydraulic pressure from said source and actuatable to direct the hydraulic pressure to said hydraulic motor and to said range selector valve simultaneously for operating said motor at a creep rate and thereby driving the speed changer at a creep rate and for furnishing hydraulic pressure to shift the speed changer to the selected range; whereby the speed changer will be driven at a creep rate to facilitate the shifting of the speed changer whenever said piston and cylinder mechanism is actuated to shift the speed changer to a different range.

18. In a hydraulic shifting mechanism for shifting a speed changer to its various speed ranges; a shifting fork connected to shift the speed changer into its several speed ranges when actuated; a first hydraulic motor operably connected to actuate said shifting fork for shifting the speed changer into its several speed ranges; a source of hydraulic pressure; a second hydraulic motor operably connected to drive the speed changer; a range selector valve operably connected to selectively direct hydraulic pressure from said source to actuate said first hydraulic motor for shifting the speed changer to a preselected speed range; a creep valve operably connected to receive hydraulic pressure from said source and actuatable to direct the hydraulic pressure to said second hydraulic motor and to said range selector valve simultaneously for operating said second hydraulic motor at a creep rate to thereby drive the speed changer at a creep rate and for furnishing hydraulic pressure to shift the speed changer to the selected range; and creep valve deactuating means connected to deactuate said creep valve and operated by the establishment of the selected speed range in the speed changer to deactuate the creep valve for terminating the flow of hydraulic pressure to both of said hydraulic motors; whereby the speed changer will be driven at a creep rate to facilitate the shifting of the speed changer whenever said first hydraulic motor is actuated to shift the speed changer to a different range and the flow of hydraulic pressure to both of said hydraulic motors will terminate when the desired speed range has been established.

19. In a machine having a speed changer for providing several speed ranges of operation; a source of electrical energy; an electrical control circuit connected to regulate the flow of electrical energy from said source for controlling the operation of the machine; a shifting fork connected to shift the speed changer into its several speed ranges when actuated; a first hydraulic motor connected to actuate said shifting fork for shifting the speed changer into its several speed ranges selectively; a second hydraulic motor operably connected to drive the speed changer; a source of hydraulic pressure; a range selector valve operably connected to selectively direct hydraulic pressure to actuate said first hydraulic motor for shifting the speed changer to a preselected speed range; a plurality of range selector solenoid coils operably connected in said electrical control circuit to be energized selectively for actuating said range selector valve to condition it for actuating said first hydraulic motor to establish the selected speed range; a creep valve operably connected to receive hydraulic pressure from said source and normally conditioned to interrupt the flow of hydraulic pressure but actuatable to admit the hydraulic pressure to said second hydraulic motor and to said range selector valve simultaneously for operating said second motor at a creep rate to thereby drive the speed changer at a creep rate and for furnishing hydraulic pressure to shift the speed changer to the selected range; a creep control solenoid coil connected in said electrical control circuit and operable to actuate said creep valve for admitting hydraulic pressure to said second hydraulic motor and to said range selector valve; selector means connected in said electrical control circuit and operable to actuate said electrical control circuit for selectively energizing said range selector solenoid coils to condition said range selector valve for actuating said first hydraulic motor to establish the desired speed range; and creep valve deactuating means connected in said electrical control circuit to de-energize said creep control solenoid coil and actuated by the establishment of the selected speed range in the speed changer to de-energize said creep control solenoid coil to deactuate said creep valve for interrupting the flow of hydraulic pressure to said hydraulic motors, said creep valve deactuating means also operating when energized to condition said electrical control circuit for initiating operation of the machine after the desired speed range has been established in the speed changer.

20. In a machine tool adapted to be operated automatically; a base; a source of power; an electrical control circuit connected to regulate the flow of power from said source for controlling the operation of the machine; a tool carrying spindle supported by said base for rotational and for axial feeding movement; a source of hydraulic pressure; a hydraulic motor connected to be actuated by said source of hydraulic pressure and to rotate said spindle and its associated cutting tool for performing a machining operation on a workpiece; an exhaust conduit connected to carry the exhaust fluid from said hydraulic motor; feeding means operably connected to be actuated by said source of power under the control of said electrical control circuit to effect the axial movement of said spindle for feeding it toward the workpiece; a pressure switch connected in said exhaust conduit to be actuated by the hydraulic pressure in said exhaust conduit and to be released whenever the pressure in said exhaust conduit is reduced excessively by reason of the stalling of the hydraulic motor, said pressure switch being connected in said electrical control circuit and functions when actuated to complete an electric circuit for actuating said feeding means and when said pressure switch is released it operates to break the electric circuit to deactuate said feeding means for interrupting the feeding of said spindle toward the workpiece; a relay connected in said electrical control circuit to be energized by the release of said pressure switch and when energized said relay operates to break the electrical circuit for actuating said feeding means to prevent the feeding of said spindle toward the workpiece; a holding circuit in said electrical control circuit connected to be completed by the energization of said relay to maintain said relay energized after said pressure switch is re-actuated to prevent the automatic restoration of the feeding movement of said spindle when the pressure is restored in said exhaust conduit; and a normally closed manual switch connected in said holding circuit and operable when actuated to interrupt the holding circuit for de-energizing said relay to initiate the feeding movement after the pressure has been restored in said exhaust conduit.

21. In a machine tool having an operating station; a source of power; a base; a plurality of quills carried by said base for lateral movement; a tool carrying spindle rotatably mounted within each of said quills to move axially with said quills; positioning means operably connected to move said quills in their lateral movement to selectively locate any of said quills with their associated spindles individually at the operating station to render the selected spindle operative; clutch means operatively connected to couple the operating spindle to said source of power when engaged to complete a driving connection from said source of power to the operating spindle; and a slide supported by said base for movement in a path parallel to the axes of said spindles and connected to be actuated in its path of travel by said source of power with the movement of said slide serving to actuate said clutch means into engagement for completing the driving connection to said spindle, said slide being located in position to move into engagement with said quill after said clutch is engaged to cause said quill to thereafter move forwardly with said slide so that further forward movement of said slide will serve to move said quill and its associated spindle forwardly relative to the workpiece without interrupting the driving connection to the spindle.

22. In a machine tool having an operating station; a source of power; a base; cutting tool storage means supported on said base for carrying a plurality of cutting tools; means operably connected to move the cutting tools in said storage means to the operating station selectively to render the selected cutting tool operative to perform a cutting operation; clutch means operatively connected to couple the operative cutting tool to said source of power when engaged to complete a driving connection from said source of power to the operating cutting tool for rotating said operating cutting tool; and feeding means operably connected to actuate said clutch means into engagement for completing the driving connection to the operative cutting tool, said feeding means being also operative, after said clutch means is engaged, to move the rotating cutting tool axially in a feeding movement for performing a cutting operation.

23. In a machine tool having an operating station; a source of power; a base; a plurality of cutting tools rotatably carried on said base and movable laterally as well as axially; positioning means operably connected to move said cutting tools for selectively locating any of said cutting tools individually at the operating station to render the selected cutting tool operative; clutch means operatively connected to couple the operating cutting tool to said source of power when engaged to complete a driving connection from said source of power to the operating cutting tool for rotating said operating cutting tool; and feeding means operably connected to actuate said clutch means into engagement for completing the driving connection to the operating cutting tool, said feeding means being also operative, after said clutch means is engaged, to move the rotating cutting tool axially in a feeding movement for performing a cutting operation.

24. In a machine tool having an operating station; a source of power; a base; cutting tool storage means mounted on said base for carrying a plurality of cutting tools; means operably connected to move the cutting tools in said storage means to the operating station selectively to render the selected cutting tool operative to perform a cutting operation; a driven clutch element carried by each of said cutting tools; a driving clutch element adapted to engage each of said driven clutch elements in driving relationship and journalled on said base in alignment with the driven clutch element of the cutting tool at the operating station, said driving clutch element being movable axially for moving into and out of engagement with the driven clutch element on the cutting tool at the operating station and being connected to be rotated by said source of power; and feeding means operably connected to move said driving clutch element axially for disengaging and engaging it with the driven clutch element on the cutting tool at the operating station to transmit power for rotating the cutting tool, said feeding means being also operative, when said driving clutch element is in engagement with a driven clutch, to move the rotating cutting tool axially in a feeding movement for performing a cutting operation.

References Cited in the file of this patent

UNITED STATES PATENTS

| | | |
|---|---|---|
| 1,461,755 | Cox | July 17, 1923 |
| 2,536,006 | Linden et al. | Dec. 26, 1950 |
| 2,736,852 | Nelson | Feb. 28, 1956 |
| 2,745,167 | Cross | May 15, 1956 |
| 2,859,644 | Watts | Nov. 11, 1958 |